(12) United States Patent
Nukada et al.

(10) Patent No.: US 10,696,808 B2
(45) Date of Patent: Jun. 30, 2020

(54) POROUS FILM AND METHOD OF FORMING POROUS FILM

(71) Applicant: FUJI XEROX CO., LTD., Tokyo (JP)

(72) Inventors: Katsumi Nukada, Kanagawa (JP); Tomoya Sasaki, Kanagawa (JP); Kana Miyazaki, Kanagawa (JP); Kenji Kajiwara, Kanagawa (JP); Masashige Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 49 days.

(21) Appl. No.: 15/361,269

(22) Filed: Nov. 25, 2016

(65) Prior Publication Data

US 2017/0369665 A1 Dec. 28, 2017

(30) Foreign Application Priority Data

Jun. 23, 2016 (JP) ................................. 2016-124647

(51) Int. Cl.
| | |
|---|---|
| *C08J 9/00* | (2006.01) |
| *C08G 73/10* | (2006.01) |
| *C09D 179/08* | (2006.01) |
| *C08J 9/26* | (2006.01) |

(52) U.S. Cl.
CPC .......... *C08J 9/0061* (2013.01); *C08G 73/105* (2013.01); *C08G 73/1067* (2013.01); *C08G 73/1071* (2013.01); *C08J 9/0028* (2013.01); *C08J 9/26* (2013.01); *C09D 179/08* (2013.01); *C08J 2201/0462* (2013.01); *C08J 2201/0464* (2013.01); *C08J 2379/08* (2013.01); *C08J 2425/08* (2013.01); *C08J 2429/14* (2013.01); *C08J 2433/04* (2013.01)

(58) Field of Classification Search
CPC ... C08J 2379/08; C08J 9/0061; C08L 2205/16
See application file for complete search history.

(56) References Cited

U.S. PATENT DOCUMENTS

| | | | |
|---|---|---|---|
| 2005/0096429 A1* | 5/2005 | Lee .......................... | B32B 27/08 525/178 |
| 2012/0283363 A1* | 11/2012 | Kumamoto .............. | C08J 5/045 524/35 |
| 2014/0127494 A1* | 5/2014 | Yakuwa ..................... | C08J 5/18 428/315.7 |

FOREIGN PATENT DOCUMENTS

| | | |
|---|---|---|
| JP | H10-302749 A | 11/1998 |
| JP | 2008-034212 A | 2/2008 |
| JP | 2010-024385 A | 2/2010 |
| JP | 2011-111470 A | 6/2011 |

(Continued)

OTHER PUBLICATIONS

Mei-Hui Tsai; Yi-Chia Huang; I-Hsiang Tseng; Hsin-Pei Yu; Yin-Kai Lin. Enhancement of Adhesion Between Copper Foil and Polyimide Film Containing Thermally Decomposable Polystyrene Particles. Journal of Applied Polymer Science, vol. 126, E365-E370 (2012). (Year: 2012).*

(Continued)

*Primary Examiner* — Shane Fang
(74) *Attorney, Agent, or Firm* — Oliff PLC

(57) ABSTRACT

A porous film includes at least one porous polyimide film that includes a polyimide resin, an organic amine compound and a resin other than a polyimide resin, and that does not include a polar aprotic solvent, wherein a content of the organic amine compound is 0.001% by weight or higher with respect to a total weight of the porous polyimide film.

16 Claims, 5 Drawing Sheets

(56) References Cited

FOREIGN PATENT DOCUMENTS

| | | |
|---|---|---|
| JP | 2012-107144 A | 6/2012 |
| JP | 2013-014742 A | 1/2013 |
| JP | 5331627 B2 | 10/2013 |
| JP | 2014-214167 A | 11/2014 |
| JP | 2014-240189 A | 12/2014 |
| JP | 2015-052107 A | 3/2015 |
| JP | 2015-071755 A | 4/2015 |
| JP | 2016-048876 A | 4/2016 |
| JP | 2016-048877 A | 4/2016 |

OTHER PUBLICATIONS

M.R. Bohloul, A. Vatani, S.M. Peyghambarzadeh. Experimental and theoretical study of CO2 solubility in N-methyl-2-pyrrolidone (NMP). Fluid Phase Equilibria 365 (2014) 106-111. (Year: 2014).*
National Center for Biotechnology Information. PubChem Database. 2-Methylimidazole, CID=12749, https://pubchem.ncbi.nlm.nih.gov/compound/2-Methylimidazole (accessed on Jun. 20, 2019) (Year: 2019).*
Apr. 21, 2020 Office Action issued in Japanese Patent Application No. 2016-124647.

* cited by examiner

POROUS FILM AND METHOD OF FORMING POROUS FILM

CROSS-REFERENCE TO RELATED APPLICATIONS

This application is based on and claims priority under 35 USC 119 from Japanese Patent Application No. 2016-124647 filed Jun. 23, 2016.

BACKGROUND

1. Technical Field

The present invention relates to a porous film and a method of forming a porous film.

2. Related Art

A polyimide resin is a material having excellent properties such as mechanical strength, chemical stability, and heat resistance, and a porous polyimide film having these properties has attracted attention.

SUMMARY

According to an aspect of the invention, there is provided a porous film including at least one porous polyimide film that includes a polyimide resin, an organic amine compound and a resin other than a polyimide resin, and that does not include a polar aprotic solvent, wherein a content of the organic amine compound is 0.001% by weight or higher with respect to a total weight of the porous polyimide film.

BRIEF DESCRIPTION OF THE DRAWINGS

Exemplary embodiments of the present invention will be described in detail based on the following figures, wherein.

DETAILED DESCRIPTION

Figure 1A:
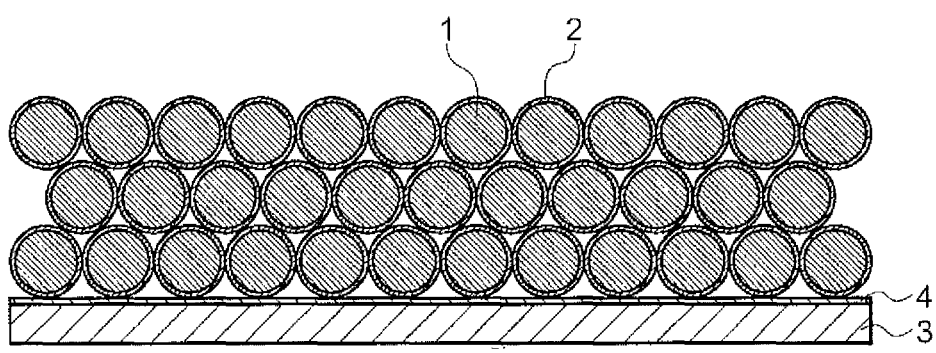
FIGS. 1A to 1D are process drawings showing an example of a method of forming a porous polyimide film which is included in a porous film according to an exemplary embodiment of the invention.

Hereinafter, an exemplary embodiment which is an example of the invention will be described.
Porous Film
A porous film according to the exemplary embodiment includes at least one porous polyimide film that includes an organic amine compound and a resin other than a polyimide resin and that does not include a polar aprotic solvent. A content of the organic amine compound is 0.001% by weight or higher with respect to the total weight of the porous polyimide film.

In the porous film according to the exemplary embodiment, due to the above-described configuration, cracking of the porous polyimide film included in the porous film is prevented. The reason is not clear but is thought to be as follows.

In a porous polyimide film, volume shrinkage caused by heat is likely to occur. A polyimide film is a rigid resin. Therefore, in a case where pores are formed in a polyimide film formed of a polyimide resin by using inorganic particles or resin particles as, for example, a template, residual stress is likely to be generated due to volume shrinkage, which may cause cracking. In addition, in a case where a porous polyimide film is formed using a polar aprotic solvent, the polar aprotic solvent is likely to remain in the porous polyimide film due to its high boiling point (for example, in the case of N-methyl pyrrolidone, 204° C.). In a case where a porous polyimide film includes a polar aprotic solvent (for example, in an amount of higher than 0.001% by weight), pores formed in the porous polyimide film are likely to be deformed due to a plastic effect caused by the solvent in the process of heating the porous polyimide film for imidization. In a case where pores are formed using resin particles, the resin particles are swollen or dissolved in a polar aprotic solvent, and thus it is difficult to control the shape of pores. As a result, residual stress may be generated due to volume shrinkage of the polyimide resin, which may cause cracking.

On the other hand, the porous polyimide film included in the porous film according to the exemplary embodiment includes a resin other than a polyimide resin and 0.001% by weight or higher of an organic amine compound with respect to the total weight of the porous polyimide film. The porous polyimide film does not include a polar aprotic solvent.

The porous polyimide film includes not only a polyimide resin but also a resin other than a polyimide resin. Therefore, residual stress generated by volume shrinkage is likely to be relaxed. Since the porous polyimide film does not include a polar aprotic solvent, the resin other than a polyimide resin (resin particles) is not likely to swell or dissolve. As a result, the shape of pores are likely to be maintained in a shape of the resin particles and are substantially spherical. Therefore, residual stress generated by volume shrinkage is more likely to be relaxed. Since the porous polyimide film does not include a polar aprotic solvent, the porous polyimide film may be fired at a low temperature (for example, 270° C.) in the process of polyimidization. Therefore, residual stress generated by volume shrinkage is more likely to be relaxed. In addition, the porous polyimide film includes a resin other than a polyimide resin and an amount of an organic amine compound in the above-described range. As a result, the flexibility of the porous polyimide film is likely to increase. Due to the above-described effects, it is thought that the cracking of the porous polyimide film is prevented.

As a result, it is thought that the cracking of the porous polyimide film included in the porous film according to the exemplary embodiment is prevented.

As described above, the porous polyimide film does not include a polar aprotic solvent. Therefore, the resin particles are not likely to swell or dissolve, and the shape of pores is likely to be maintained in a shape of the resin particles. As a result, the shape of pores is likely to be substantially spherical, and the pore diameter is likely to be substantially uniform.

It is preferable that a method of forming the porous film having the above-described configurations includes: a first step of forming a coating film including a polyimide precursor solution and resin particles and drying the coating film to form a film including a polyimide precursor and the resin particles, the polyimide precursor solution being obtained by dissolving the polyimide precursor and an organic amine compound in an aqueous solvent, and the resin particles being insoluble in the polyimide precursor solution; and a second step of forming a polyimide film by heating the film to imidize the polyimide precursor and before or after the heating, performing a treatment of removing the resin particles. Through the above-described forming steps, the porous polyimide film is obtained.

In the porous polyimide film included in the porous film which is obtained using the above-described forming method, cracking is likely to be prevented. The reason is not clear but is thought to be as follows.

A polyimide film is formed, for example, by applying a polyimide precursor solution in which a polyimide precursor is dissolved in a polar aprotic solvent (for example, N-methylpyrrolidone (hereinafter, also referred to as "NMP") or N,N-dimethylacetamide (hereinafter, also referred to as "DMAc") and then heating the polyimide precursor solution.

In the related art, a porous polyimide film is obtained using a polyimide precursor solution in which a polyimide precursor is dissolved in an organic solvent. Examples of a method of obtaining a porous polyimide film include: a method of obtaining a porous polyimide film by forming pores having a three-dimensionally ordered macroporous structure (3DOM structure) using a silica particle layer as a template; and a method of obtaining a porous polyimide film by preparing a film using a varnish in which silica particles are dispersed in a polyimide precursor solution, firing the film, and removing the silica particles. In the porous polyimide films obtained using these methods, cracking is likely to occur. The reason for this is thought to be that, since the silica particles are not likely to absorb volume shrinkage in an imidization step, strains (residual stress) are likely to be generated in the film.

Further, a method of forming a film using a solution in which a water-soluble resin such as polyethylene glycol is dissolved in a polyimide precursor solution, and bringing the film into contact with a poor solvent such as water to promote deposition of polyamic acid and formation of pores such that the film is imidized is known. However, in this method, polyamic acid is deposited in a porous shape by replacing a solvent such as NMP for dissolving polyamic acid with a poor solvent such as water, and it is difficult to control the shape and size of pores.

In addition, for example, a method of preparing a porous polyimide film by obtaining a polyimide-particle composite film using a varnish solution including polyamic acid or polyimide and particles, and then removing the particles from the polyimide-particle composite film may be used. In this method, a solvent including a polar aprotic solvent is used as a solvent in the varnish solution. In a case where the particles are resin particles, the resin particles swell or dissolve in the varnish solution. Therefore, in this method, it is difficult to use resin particles as the particles, and silica particles are used. However, since silica particles are used, residual stress is likely to be generated due to volume shrinkage, and a porous polyimide film obtained using this method is likely to crack.

On the other hand, in the method of forming a porous film according to the exemplary embodiment, in the process of forming a porous polyimide film, a polyimide precursor solution in which a polyimide precursor and an organic amine compound are dissolved in an aqueous solvent, and a resin other than a polyimide resin (resin particles) that is soluble in a solvent in which a polyimide resin is insoluble are used. Therefore, a film including a polyimide precursor and resin particles may be formed while maintaining the shape of the resin particles. In the step of heating the film for imidization, the resin particles may be removed while maintaining the shape of the resin particles. As a result, residual stress generated by volume shrinkage is likely to be relaxed. Further, the porous polyimide film obtained in the above-described steps includes a resin other than a polyimide resin and an organic amine compound. Therefore, the flexibility of the porous polyimide film is likely to increase. Due to the above-described effects, it is thought that cracking is prevented.

In the porous polyimide film obtained in the above-described forming steps, variations in the shape of pores, the pore diameter, and the like are likely to be prevented. The reason for this is thought to be that the use of resin particles in the forming steps effectively contributes to relaxation of residual stress in the step of imidizing the polyimide precursor.

In addition, in the porous polyimide film obtained in the above-described forming steps, the polyimide precursor is dissolved in the aqueous solvent. Therefore, the boiling point of the polyimide precursor solution is about 100° C. While heating the film including the polyimide precursor and the resin particles, the solvent is rapidly volatilized, and then an imidization reaction progresses. Before the resin particles in the film are deformed by heat, the fluidity of the film is lost, and the film is insoluble in an organic solvent. Therefore, it is thought that the shape of pores is likely to be maintained, and variations in the shape of pores, the pore diameter, and the like are likely to be prevented.

In addition, in the above-described steps of forming a porous polyimide film, the porous polyimide film does not include a polar aprotic solvent. Therefore, the resin particles are not likely to swell or dissolve. As a result, the shape of pores is likely to be maintained in a shape of the resin particles and is likely to be substantially spherical, and thus the pore diameter is likely to be uniform.

In a case where silica particles are used, it is necessary to use a chemical such as hydrofluoric acid in a treatment of removing the silica particles. In a case a template of a silica particle layer is prepared, the silica particle layer is formed. Therefore, the productivity is low, and the costs are high. In addition, in a case where silica particles are used, a chemical such as hydrofluoric acid is used. Therefore, it is thought that ions are likely to remain as impurities.

On the other hand, in the porous polyimide film obtained in the above-described forming steps, silica particles are not used. Therefore, the steps for obtaining the porous polyimide film is simplified. In addition, hydrofluoric acid is not used to remove the resin particles. Therefore, the remaining of ions as impurities is prevented.

Hereinafter, the porous polyimide film included in the porous film according to the exemplary embodiment and the steps of forming the porous polyimide film will be described.

Specifically, the polyimide resin included in the porous polyimide film is obtained by polymerizing tetracarboxylic dianhydride and a diamine compound to prepare a polyimide precursor, obtaining a solution of the polyimide precursor, and performing an imidization reaction using this solution. More specifically, the polyimide resin is obtained by performing an imidization reaction using a polyimide precursor solution in which the polyimide precursor and an organic amine compound are dissolved in an aqueous solvent. For example, a method of obtaining a polyimide precursor solution by polymerizing tetracarboxylic dianhydride and a diamine compound in an aqueous solvent in the presence of an organic amine compound to prepare a resin (polyimide precursor) may be used. However, the invention is not limited to this example. The polyimide precursor solution will be described below.

It is preferable that the resin other than a polyimide resin included in the porous polyimide film is soluble in a solvent in which a polyimide resin is insoluble. The resin other than a polyimide resin may be included in a state where the shape of the resin particles are maintained, or may have a shape of the resin particles. That is, there is no particular limitation as long as the porous polyimide film obtained in the above-described forming steps include the resin other than a polyimide resin. Pores of the porous polyimide film obtained in the above-described forming steps have a substantially spherical shape. The resin particles will be described below.

Here, "a polyimide resin is insoluble" denotes that a polyimide resin is substantially insoluble at 25° C., and the meaning thereof includes not only a case where a polyimide resin is insoluble but also a case where a polyimide resin is soluble within a range of 3% by weight or lower.

Further, the porous polyimide film does not include a polar aprotic solvent (for example, N-methylpyrrolidone). The polar aprotic solvent will be described below.

In this specification, "not including a polar aprotic solvent" denotes that a polar aprotic solvent is not substantially included. That is, the meaning includes not only a case where a polar aprotic solvent is not included (for example, the content of a polar aprotic solvent is a detection limit or lower when measured using an analyzer (for example, a pyrolysis gas chromatograph)) but also a case where the content of a polar aprotic solvent is 0.001% by weight or lower with respect to the total weight of the porous polyimide film.

Method of Forming Porous Polyimide Film

First, the method (steps) of forming a porous polyimide film will be described.

In the drawings to be referred to in the description of the forming method, the same components are represented by the same reference numerals. In the drawings, reference numeral 1 represents resin particles, reference numeral 2 represents a binder resin, reference numeral 3 represents a substrate, reference numeral 4 represents a release layer, reference numeral 5 represents a polyimide precursor solution, reference numeral 7 represents pores, reference numeral 61 represents a film (polyimide film) in the process of imidizing a polyimide precursor, and reference numeral 62 represents a porous polyimide film.

The method of forming a porous polyimide film is not particularly limited and includes, for example, a first step and a second step described below.

In the first step, a coating film including a polyimide precursor solution and resin particles is formed, and the coating film is dried to form a film including a polyimide precursor and the resin particles, the polyimide precursor solution being obtained by dissolving the polyimide precursor and an organic amine compound in an aqueous solvent, and the resin particles being insoluble in the polyimide precursor solution.

In the second step, the film is heated to imidize the polyimide precursor such that a polyimide film is formed, in which a treatment of removing the resin particles is included. Regarding the treatment of removing the resin particles, in a case where the resin particles are removed using an organic solvent for dissolving the resin particles, even when the removability is low in order to crosslink the resin, the resin particles may be removed by heating.

Here, "the resin particles which are insoluble in the polyimide precursor solution" denotes that the resin particles are not substantially insoluble in the polyimide precursor solution at 25° C., and the meaning thereof includes not only a case where the resin particles are insoluble in the polyimide precursor solution but also the resin particles are soluble in the polyimide precursor solution within a range of 3% by weight or lower.

Hereinafter, a forming method shown in FIGS. 1A to 1D (an example of the method of forming the porous polyimide film which is included in the porous film according to the exemplary embodiment) will be described, but the invention is not limited thereto.

First Step

In the first step, first, a polyimide precursor solution in which a polyimide precursor is dissolved in an aqueous solvent is prepared. As the polyimide precursor solution in which a polyimide precursor is dissolved, for example, a polyimide precursor solution in which a polyimide precursor and an organic amine compound are dissolved is preferable. Hereinafter, an example using the polyimide precursor solution in which a polyimide precursor and an organic amine compound are dissolved will be described.

Next, a coating film including the polyimide precursor solution and resin particles is formed on a substrate, the resin particle being insoluble in the polyimide precursor solution. The coating film formed on the substrate is dried to form a film including the polyimide precursor and the resin particles.

In the following description, the resin particles are formed of a resin other than a polyimide resin.

In the first step, the details of a method of forming the coating film including the polyimide precursor solution and the resin particles, which are insoluble in the polyimide precursor solution, on the substrate are, for example, as follows.

First, a resin particle dispersion is prepared, the dispersion including: the resin particles which are insoluble in the polyimide precursor solution; an organic solvent in which the resin particles are insoluble; and a binder resin to be dissolved in the organic solvent. Next, this resin particle dispersion is applied to the substrate and dried to form a resin particle layer. In the resin particle layer formed on the substrate, for example, adjacent resin particles are present without dissolving and are bonded to each other through the binder resin. In addition, pores are formed between the resin particles of the resin particle layer (refer to FIG. 1A).

A polyimide precursor solution obtained by dissolving a polyimide precursor and an organic amine compound in an aqueous solvent is prepared in advance.

The polyimide precursor solution prepared in advance is impregnated into the pores between the resin particles of the resin particle layer formed on the substrate. By impregnating the polyimide precursor solution into the pores between the resin particles of the resin particle layer, the pores formed between the resin particles of the resin particle layer are filled with the polyimide precursor solution. In order to promote the filling, it is preferable that the pressure is reduced in a state where the polyimide precursor solution and the resin particles contact with each other to remove a gas component between the pores. Next, the coating film is dried to form a film including the polyimide precursor and the resin particles on the substrate (refer to FIG. 1B).

The substrate on which the film including the polyimide precursor and the resin particles is formed is not particularly limited. Examples of the substrate include: a resin substrate such as polystyrene or polyethylene terephthalate; a glass substrate; a ceramic substrate; a metal substrate such as iron or stainless steel (SUS); and a composite material substrate obtained by combining the above-described materials with each other. Optionally a release layer may be provided on the substrate by treating the substrate with, for example, a silicone or fluorine release agent. It is also effective that the surface of the substrate is roughened to have a particle diameter similar to the particle diameter of the resin particles such that the exposure of surfaces of the resin particles contacting the substrate are promoted.

A method of preparing the resin particle dispersion is not particularly limited. For example, a method may be used, including: weighing the resin particles which are insoluble in the polyimide precursor solution, the organic solvent in which the resin particles are insoluble, and the binder resin to be dissolved in the organic solvent; and mixing and stirring the components. Regarding the resin particles, a dispersion in which the resin particles are dispersed in advance may be prepared, or a commercially available product in which the resin particles are dispersed in advance may be used. In a case where the dispersion in which the resin particles are dispersed in advance is prepared, the dispersibility of the resin particles may be improved using at least one of an ionic surfactant or a non-ionic surfactant.

The binder resin may be dissolved in the above-described organic solvent in advance, or may be dissolved in the mixture of the resin particles and the organic solvent. As the solvent, from the viewpoint of preventing the resin particles from dissolving therein, an alcoholic solvent is preferable, and the solvent may include water.

Here, "the organic solvent in which the resin particles are insoluble" denotes that the resin particles as a target are substantially insoluble in the organic solvent at 25° C., and the meaning thereof includes not only a case where the resin particles as a target are insoluble in the organic solvent but also a case where the resin particles as a target are soluble in the organic solvent within a range of 3% by weight or lower.

A ratio (weight ratio; resin particles:binder resin) of the resin particles to the binder resin in the resin particle dispersion is preferably in a range from 100:0.5 to 100:50. The ratio is more preferably in a range from 100:1 to 100:30, and still more preferably in a range from 100:2 to 100:20. In a case where the ratio is in the above-described range, the binder resin covers a part or the entire area of the surface of each of the resin particles in the resin particle layer, which is formed using the resin particle dispersion, such that a state where adjacent resin particles are bonded to each other (primarily bonded to each other; including a so-called pseudo-bonding state) is likely to be formed. Pores in the form of an air space are likely to be formed between the resin particles of the resin particle layer.

The resin particles are not particularly limited as long as they are insoluble in the polyimide precursor solution. Examples of the resin particles include: resin particles obtained by polymerization of polymerizable monomers such as a polyester resin or a urethane resin; and resin particles obtained by radical polymerization of polymerizable monomers such as a vinyl resin or an olefin resin. Examples of the resin particles obtained by radical polymerization include resin particles of a (meth) acrylic resin, a (meth) acrylate resin, a styrene-(meth) acrylic resin, a polystyrene resin, a polyethylene resin, and the like.

From the viewpoint of removing the resin particles in the second step described below, it is preferable that the resin particles are soluble in a solvent in which a polyimide resin is insoluble. Specifically, it is preferable that the resin other than a polyimide resin which is included in the porous polyimide film is a resin which is soluble in an organic solvent such as tetrahydrofuran, toluene, ethyl acetate, or acetone.

In particular, from the viewpoints of the control of the shape of particles and removability, it is preferable that the resin particles are formed of a resin obtained using radically polymerizable monomers, and it is more preferable that the resin particles are formed of at least one selected from the group consisting of a (meth) acrylic resin, a (meth) acrylate resin, a styrene-(meth) acrylic resin, and a polystyrene resin.

Here, "soluble in the organic solvent" denotes that the resin particles as a target are soluble in the organic solvent as a target at 25° C. in an amount of 10% by weight or higher.

In this specification, "(meth) acryl" represents both "acryl" and "methacryl".

For example, in a case where the resin particles are vinyl resin particles, a synthesis method thereof is not particularly limited, and a well-known polymerization method (a radical polymerization method such as emulsion polymerization, soap-free emulsion polymerization, suspension polymerization, miniemulsion polymerization, microemulsion polymerization) may be used.

For example, in a case where an emulsion polymerization method is used to prepare vinyl resin particles, the vinyl resin particles are obtained by adding monomers such as a styrene or a (meth) acrylic acid to water, in which a water-soluble polymerization initiator such as potassium persulfate or ammonium persulfate is dissolved, optionally adding a surfactant such as sodium dodecyl sulfate or a diphenyl oxide disulfonate, and heating the components while stirring them.

Examples of a monomer of the vinyl resin include a vinyl resin unit obtained by polymerization of the following monomers including: styrenes having a styrene skeleton such as styrene, an alkyl-substituted styrene (for example, α-methylstyrene, 2-methylstyrene, 3-methylstyrene, 4-methylstyrene, 2-ethylstyrene, 3-ethylstyrene, or 4-ethylstyrene), a halogen-substituted styrene (for example, 2-chlorostyrene, 3-chlorostyrene, or 4-chlorostyrene), or vinylnaphthalene; esters having a vinyl group such as methyl (meth)acrylate, ethyl (meth)acrylate, n-propyl (meth)acrylate, n-butyl (meth)acrylate, lauryl (meth)acrylate, or 2-ethylhexyl (meth)acrylate; vinyl nitriles such as acrylonitrile or methacrylonitrile; vinyl ethers such as vinyl methyl ether or vinyl isobutyl ether; vinyl ketones such as vinyl methyl ketone, vinyl ethyl ketone or vinyl isopropenyl ketone; acids such as (meth) acrylic acid, maleic acid, cinnamic acid, fumaric acid, or vinylsulfonic acid; and bases such as ethyleneimine, vinylpyridine, or vinylamine.

Examples of other monomers which may be used in combination include: monofunctional monomers such as vinyl acetate; bifunctional monomers such as ethylene glycol dimethacrylate, nonane diacrylate, or decanediol diacrylate; and polyfunctional monomers such as trimethylolpropane triacrylate or trimethylolpropane trimethacrylate.

The vinyl resin may be a resin which is obtained using one monomer among the above-described monomers, or may be a copolymer which is obtained using two or more monomers among the above-described monomers.

In a case where the monomers used in the resin constituting the vinyl resin particles include styrene, a ratio of the styrene to all the monomer components is preferably from 20% by weight to 100% by weight and more preferably from 40% by weight to 100% by weight.

The average particle diameter of the resin particles is not particularly limited and, for example, is 2.5 µm or less, preferably 2.0 μm or less, and more preferably 1.0 μm or less. The lower limit is not particularly limited and, for example, is 0.001 μm or more, preferably 0.005 μm or more, and more preferably 0.01 μm or more.

In order to obtain the average particle diameter of the resin particles, using a particle diameter distribution which is obtained from measurement of a laser diffraction particle diameter distribution analyzer (for example, LA-700 manufactured by Horiba Ltd.), a volume cumulative distribution is drawn on divided particle diameter ranges (channels) in order from the smallest particle diameter. A particle diameter having a cumulative value of 50% with respect to all the particles is defined as a volume average particle diameter D50v.

As the resin particles of the resin other than a polyimide resin that is soluble in a solvent in which a polyimide resin is insoluble, for example, non-crosslinked resin particles having a non-crosslinked structure are preferable. However, the resin particles may be crosslinked within a range where the above-described solubility is satisfied. Specific examples of the resin particles include polymethyl methacrylate (MB series, manufactured by Sekisui Plastics Co., Ltd.), a (meth) acrylate-styrene copolymer (FS series, manufactured by Nipponpaint Co., Ltd.), and polystyrene.

The binder resin is not particularly limited as long as it is soluble in an organic solvent and is insoluble in the polyimide precursor solution. Examples of the binder resin include: acetal resins such as a polyvinyl butyral resin; polyamide resins such as nylon; polyester resins such as polyethylene terephthalate or polyethylene naphthalate; polyolefin resins such as polyethylene or polypropylene; vinyl resins such as an acrylic resin, a polyvinyl chloride resin, or a polyvinylidene chloride resin; polyurethane resins; and polyvinyl pyrrolidone, polyethylene glycol, and polyvinyl alcohol. Among these, a polyvinyl acetal resin or an aliphatic polyamide resin is preferable.

Examples of the organic solvent in which the resin particles are insoluble include alcohols such as methanol, ethanol, or ethylene glycol; cellosolves such as ethylene glycol monomethyl ether; hydrocarbons such as hexane; ketones such as acetone; aromatic solvents such as toluene; esters such as ethyl acetate; and nitriles such as acetonitrile.

Among these, from the viewpoint of maintaining the shape of the resin particles, alcohols or cellosolves are preferable, and as the binder resin, a resin (for example, a polyethylene glycol resin, an acetal resin, or a polyamide resin) which is soluble in alcohols or cellosolves is preferable.

A method of applying the resin particle dispersion to the substrate is not particularly limited. Examples of the method include various methods such as a spray coating method, a spin coating method, a roll coating method, a bar coating method, a slit die coating method, or an ink jet coating method.

The coating film which is formed by applying the resin particle dispersion to the substrate is dried to obtain a resin particle layer. The drying temperature is not particularly limited as long as it is a temperature (for example, 100° C.) at which the shape of the resin particles is maintained and the resin particles are bonded to each other.

Next, the polyimide precursor solution prepared in advance is impregnated into the pores between the resin particles of the resin particle layer formed as described above to form a coating film including the polyimide precursor solution and the resin particles. The coating film is dried to form a film including the polyimide precursor and the resin particles.

A method of impregnating the polyimide precursor solution is not particularly limited. Examples of the method include a method of dipping the substrate, on which the resin particle layer is formed, in the polyimide precursor solution, and a method of applying the polyimide precursor solution to the resin particle layer, which is formed on the substrate, to impregnate the polyimide precursor solution into the pores between the particles of the resin particle layer.

Examples of the method of applying the polyimide precursor solution to the resin particle layer formed on the substrate include various methods such as a spray coating method, a spin coating method, a roll coating method, a bar coating method, a slit die coating method, or an ink jet coating method. From the viewpoint of impregnating the polyimide precursor solution into the pores between the resin particles which forms the resin particle layer, it is preferable that a vacuum impregnation filling method of applying the polyimide precursor solution to the resin particle layer and filling the pores between the resin particles with the polyimide precursor solution under reduced pressure is adopted because the polyimide precursor solution is efficiently impregnated into the pores between the resin particles.

A method of forming the coating film including the polyimide precursor solution and the resin particles is not limited to the above-described method.

For example, specifically, the following method is used. First, a polyimide precursor solution obtained by dissolving the polyimide precursor and the organic amine compound in the aqueous solvent is prepared. Next, the polyimide precursor solution is mixed with resin particles, which is insoluble in the polyimide precursor solution, to obtain a polyimide precursor solution in which the resin particles are dispersed (hereinafter, also referred to as "resin particle-dispersed polyimide precursor solution"). This resin particle-dispersed polyimide precursor solution is applied to the substrate to form a coating film including the polyimide precursor solution and the resin particles. The resin particles in the coating film are dispersed in a state where aggregation is prevented (refer to FIG. 3A). Next, the coating film is dried to form a film including the polyimide precursor and the resin particles on the substrate.

A method of preparing the resin particle-dispersed polyimide precursor solution is not particularly limited. Examples of the method include a method of mixing the polyimide precursor solution with dry resin particles, and a method of mixing the polyimide precursor solution with a dispersion in which the resin particles are dispersed in the aqueous solvent in advance. From the viewpoint of simplifying the steps, it is also preferable that the polyimide precursor is synthesized in an aqueous solvent dispersion in which resin particles, which are insoluble in the polyimide precursor solution, are dispersed in the aqueous solvent in advance.

As the dispersion in which the resin particles are dispersed in the aqueous solvent in advance, a dispersion in which the resin particles are dispersed in the aqueous solvent in advance may be prepared, or a commercially available dispersion in which the resin particles are dispersed in the aqueous solvent in advance may be used. In a case where the dispersion in which the resin particles are dispersed in advance is prepared, the dispersibility of the resin particles may be improved using at least one of an ionic surfactant or a non-ionic surfactant.

In the polyimide precursor solution in which the resin particles are dispersed, a weight ratio (solid content of polyimide precursor solution:resin particles) of the solid content of the polyimide precursor solution, which is 100, to the resin particles is in a range from 100:20 to 100:600. The weight ratio is more preferably in a range from 100:25 to 100:550, and still more preferably in a range from 100:30 to 100:500.

A method of applying the resin particle-dispersed polyimide precursor solution to the substrate is not particularly limited. Examples of the method include various methods such as a spray coating method, a spin coating method, a roll coating method, a bar coating method, a slit die coating method, or an ink jet coating method.

It is preferable that the amount of the polyimide precursor solution applied to obtain the coating film including the polyimide precursor solution and the resin particles, which is obtained using the above-described method, is determined such that the resin particles are exposed from the surface of the coating film from the viewpoint of increasing the area ratio of the pores in the porous polyimide film. For example, in a case where the polyimide precursor solution is impregnated into the pores between the resin particles which form the resin particle layer, it is preferable that the polyimide precursor solution is impregnated such that the amount thereof applied is less than the thickness of the resin particle layer.

In a case where the resin particle-dispersed polyimide precursor solution is applied to the substrate to form a coating film, it is preferable that the resin particles are added in an amount in which the resin particles are exposed from the surface of the coating film.

After the coating film including the polyimide precursor solution and the resin particles, which is obtained using the above-described method, is formed, the coating film is dried to form a film including the polyimide precursor and the resin particles. Specifically, the coating film including the polyimide precursor solution and the resin particles is dried using, for example, a method such as heating drying, natural drying, or vacuum drying to form the film. More specifically, the coating film is dried to form the film such that the amount of the solvent remaining in the film is 50% or lower (preferably 30% or lower) with respect to the solid content of the film. This film is in a state where the polyimide precursor is soluble in water.

In addition, during the formation of the coating film, the resin particles are added in an amount in which the resin particles are embedded in the coating film. In this case, after the coating film is obtained in the first step, a treatment of exposing the resin particles is performed in the process of forming the coating film and drying the coating film to form the film such that the resin particles are exposed. By performing the treatment of exposing the resin particles, the area ratio of the pores in the porous polyimide film is increased.

Specific examples of the treatment of exposing the resin particles include the following method.

Figure 1B:
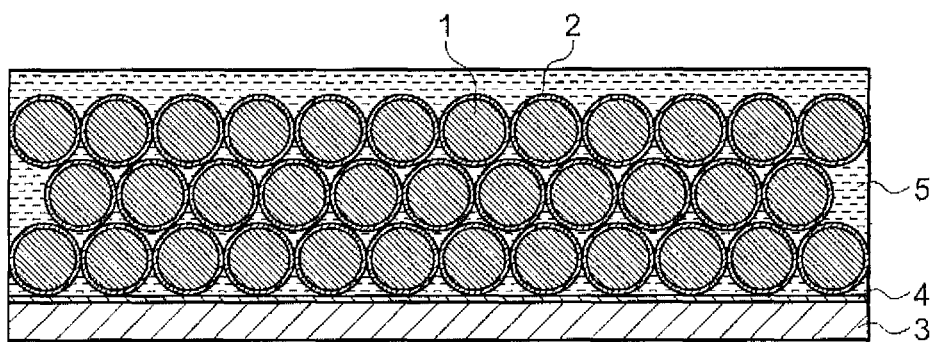
Figure 1C:
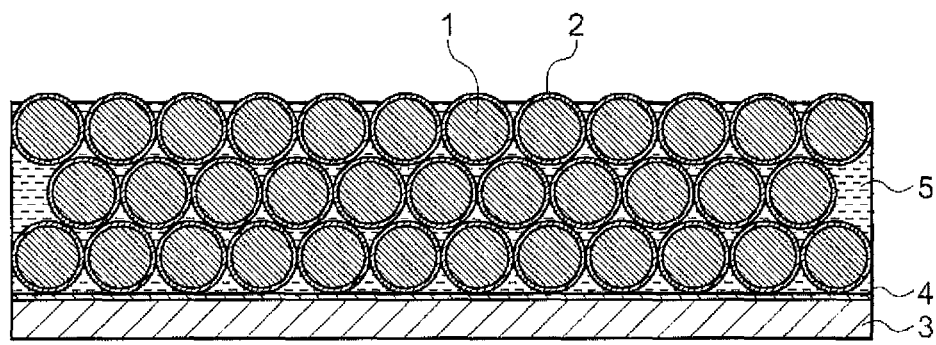

In a case where the polyimide precursor solution is impregnated into the pores between the resin particles, which forms the resin particle layer, to form a coating film such that the resin particle layer is embedded in the coating film, the polyimide precursor solution is present in a region of the thickness of the resin particle layer or more (refer to FIG. 1B).

After the coating film including the polyimide precursor solution and the resin particles is obtained, in the process of drying the coating film to form a film including the polyimide precursor and the resin particles, as described above, the film is in a state where the polyimide precursor is soluble in water. When the film is in this state, for example, the resin particles may be exposed through, for example, a wiping treatment or a treatment of dipping the film in water. Specifically, the polyimide precursor solution present in a region of the thickness of the resin particle layer or more is removed by performing the treatment of exposing the resin particle layer through, for example, water wiping. Resin particles present in an upper region of the resin particle layer (that is, a region of the resin particle layer on a side distant from the substrate) are exposed from the surface of the film (refer to FIG. 1C).

Even in a case where the film is formed on the substrate using the resin particle-dispersed polyimide precursor solution such that the resin particles are embedded in the film, the same treatment as the above-described treatment of exposing the resin particles may be adopted as a treatment of exposing the resin particle embedded in the film.

Second Step

In the second step, the film including the polyimide precursor and the resin particles, which is obtained in the first step, is heated to imidize the polyimide precursor such that a polyimide film is formed. In the second step, a treatment of removing the resin particles is included. Through the treatment of removing the resin particles, a porous polyimide film is obtained.

In the second step, in the process of forming the polyimide film, specifically, the film including the polyimide precursor and the resin particles, which is obtained in the first step, is heated to promote imidization and is further heated to form the polyimide film. As the imidization progresses and the imidization ratio increases, the film becomes insoluble in the organic solvent.

In the second step, the treatment of removing the resin particles is performed. The resin particles may be removed in the process of heating the film to imidize the polyimide precursor, or may be removed from the polyimide film after the completion of the imidization (after imidization).

In the exemplary embodiment, the process of imidizing the polyimide precursor denotes the process before the state where the imidized polyimide film is obtained by heating the film including the polyimide precursor and the resin particles, which is obtained in the first step, to promote the imidization.

Specifically, the coating film, which is obtained in the first step and from which the resin particles are exposed, is heated such that the resin particles are removed from the coating film in the process of imidizing the polyimide precursor (hereinafter, the film in this state will be referred to as "polyimide film"). Alternatively, the resin particles may be removed from the imidized polyimide film. The porous polyimide film from which the resin particles are removed is obtained (refer to FIG. 1D).

In the process of removing the resin particles, the porous polyimide film includes the resin component of the resin particles as the resin other than a polyimide resin. Although not shown in the drawing, the porous polyimide film includes the resin other than a polyimide resin.

From the viewpoint of removability for the resin particles, It is preferable that the treatment of removing the resin particles is performed when the imidization ratio of the polyimide precursor in the polyimide film is 10% or higher in the process of imidizing the polyimide precursor. When the imidization ratio is 10% or higher, the polyimide film is not likely to be dissolved in an organic solvent, and the form thereof is likely to be maintained.

The treatment of removing the resin particles is not particularly limited as long as the porous polyimide film including the resin is obtained. Examples of the treatment include a method of decomposing and removing the resin particles by heating, a method of removing the resin particles using an organic solvent for dissolving the resin particles, and a method of removing the resin particles by decomposing with laser or the like.

For example, the resin particles may be removed by performing only the method of decomposing and removing the resin particles by heating, or may be removed by performing both the method of decomposing and removing the resin particles by heating and the method of removing the resin particles using an organic solvent for dissolving the resin particles in combination. From the viewpoint of promoting the relaxation of residual stress and preventing cracking of the porous polyimide film, the method which includes the treatment of removing the resin particles using an organic solvent for dissolving the resin particles is preferable. The reason for this effect is thought to be that, in the treatment of removing the resin particles using an organic solvent, the resin component dissolved in the organic solvent easily move into the polyimide resin.

For example, in the method of heating the resin particles to be removed, cracked gas may be produced due to heating depending on the kind of the resin particles. Due to this cracked gas, for example, the porous polyimide film may fracture or crack. Therefore, from the viewpoint of preventing cracking, it is preferable that the method of removing the resin particles using an organic solvent for dissolving the resin particles is adopted.

After removing the resin particles using an organic solvent for dissolving the resin particles, it is also effective to further perform the heating method to improve the removal rate.

In a case where the resin particles are removed using the method of removing the resin particles using an organic solvent for dissolving the resin particles, the resin component of the resin particles dissolved in the organic solvent may infiltrate into the polyimide film in the process of removing the resin particles. Therefore, by adopting this method, the obtained porous polyimide film may actively include the resin other than a polyimide resin. From the viewpoint of including the resin other than a polyimide resin, it is preferable that the method of removing the resin particles using an organic solvent for dissolving the resin particles is adopted. Further, from the viewpoint of including the resin other than a polyimide resin, it is preferable that the method of removing the resin particles using an organic solvent for dissolving the resin particles is performed on the film in the process of imidizing the polyimide precursor (polyimide film). By dissolving the resin particles in the form of the polyimide film in the solvent for dissolving the resin particles, the resin particles are more likely to infiltrate into the polyimide film.

Examples of the method of removing the resin particles using an organic solvent for dissolving the resin particles include a method of bringing the resin particles into contact with an organic solvent for dissolving the resin particles (for example, dipping the resin particles in the solvent, bringing the resin particles into contact with solvent vapor) to dissolve the resin particle therein. It is preferable that the resin particles are dipped in the solvent in the above-described state from the viewpoint of increasing the dissolution efficiency of the resin particles.

The organic solvent for dissolving the resin particles to be removed is not particularly limited as long as the polyimide film and the imidized polyimide film are insoluble therein and the resin particles are soluble therein. Examples of the organic solvent include: ethers such as tetrahydrofuran or 1,4-dioxane; aromatic solvents such as benzene or toluene; ketones such as acetone; and esters such as ethyl acetate.

Among these, ethers such as tetrahydrofuran or 1,4-dioxane or aromatic solvents such as benzene or toluene are preferable, and tetrahydrofuran or toluene is more preferable.

In a case where an aqueous solvent remains during the dissolution of the resin particles, the aqueous solvent is dissolved in the solvent for dissolving the non-crosslinked resin particles and the polyimide precursor is deposited such that the film is in a state similar to that in a so-called wet phase inversion method. As a result, it may be difficult to control the pore diameter. Therefore, it is preferable that the non-crosslinked resin particles are removed by being dissolved in the organic solvent after reducing the amount of the remaining aqueous solvent to be 20% by weight or lower and preferably 10% by weight or lower with respect to the weight of the polyimide precursor.

In the second step, a heating method of heating the film obtained in the first step to promote imidization such that a polyimide film is obtained is not particularly limited. Examples of the method include a method of heating the film in multiple stages of two or more stages. For example, in a case where the film is heated in two stages, a specific example of heating conditions is as follows.

Regarding heating conditions of the first stage, it is preferable that the temperature is a temperature at which the shape of the resin particles is maintained. Specifically, the temperature is, for example, in a range from 50° C. to 150° C. and preferably in a range from 60° C. to 140° C. In addition, it is preferable that the heating time is in a range from 10 minutes to 60 minutes. As the heating temperature increases, the heating temperature decreases, which is preferable.

Regarding heating conditions of the second stage, for example, heating is performed at 150° C. to 400° C. (preferably 200° C. to 390° C.) for 20 minutes to 120 minutes. By setting the heating conditions to be in the above-described ranges, the imidization reaction further progresses, and a polyimide film may be formed. During the heating reaction, it is preferable that the temperature is increased stepwise or is increased slowly at a fixed rate before reaching a final heating temperature.

The heating conditions are not limited to the above-described conditions of the two-step heating method. For example, a one-step heating method may be adopted. In the case of the one-step heating method, for example, the imidization may be completed under only the heating conditions shown in the second stage.

In a case where the treatment of exposing the resin particles is not performed in the first step, from the viewpoint of increasing the area ratio of the pores, the treatment for exposing the resin particles may be performed in the second step to expose the resin particles. In the second step, it is preferable that the treatment of exposing the resin particles is performed in the process of imidizing the polyimide precursor or after imidization and before the treatment of removing the resin particles.

Figure 2A:
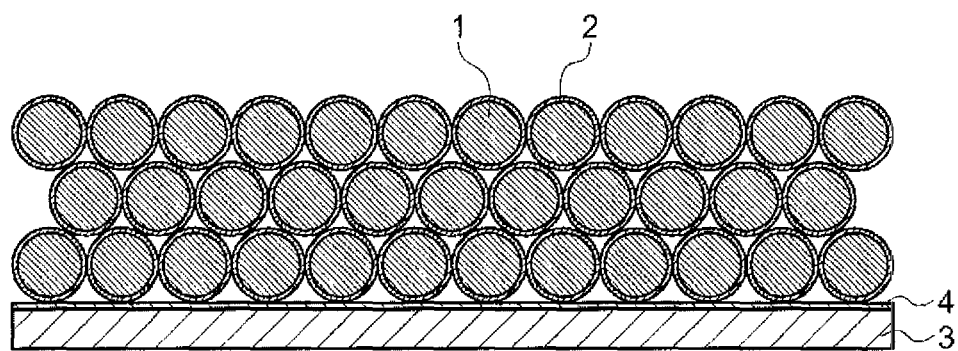
FIGS. 2A to 2D are process drawings showing another example of the method of forming the porous polyimide film which is included in the porous film according to the exemplary embodiment.
Figure 2B:
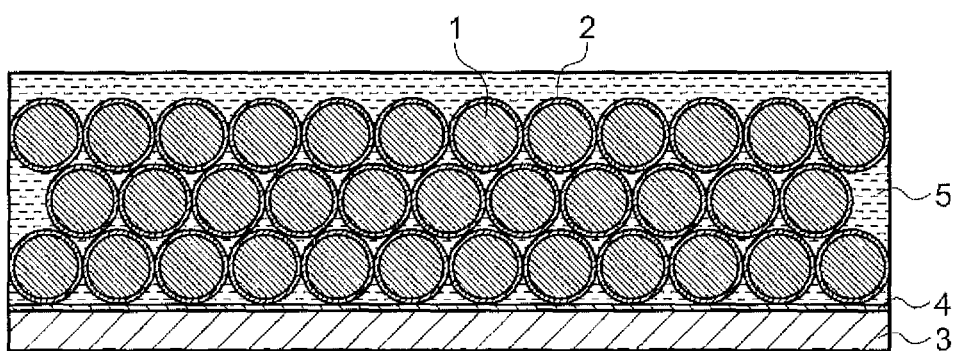

For example, in the first step, the resin particle layer is formed on the substrate (refer to FIG. 2A), and the polyimide precursor solution is impregnated into the pores between the resin particles of the resin particle layer to form a coating film in a state where the resin particles are embedded in the coating film (refer to FIG. 2B). Next, in the process of drying the coating film to form a film, a film including the polyimide precursor and the resin particles is formed without performing the treatment of exposing the resin particles. The film formed using this method is formed in a state where the resin particle layers are embedded in the coating film. The treatment of exposing the resin particles from the polyimide film by heating the film is performed before the treatment of removing the resin particles and in the process of imidizing the polyimide precursor, or after the completion of the imidization (after imidization).

In the second step, the treatment of exposing the resin particles is performed, for example, in a case where the polyimide film is in the following state.

In a case where the treatment of exposing the resin particles is performed when the imidization ratio of the polyimide precursor in the polyimide film is lower than 10% (that is, a state where the polyimide film is soluble in water), for example, a wiping treatment or a treatment of dipping the film in water may be used as the treatment of exposing the resin particles embedded in the polyimide film.

In addition, in a case where the treatment of exposing the resin particles is performed when the imidization ratio of the polyimide precursor in the polyimide film is 10% or higher (that is, a state where the polyimide film is not likely to be dissolved in an organic solvent) and when the imidization of the polyimide film is completed, for example, a method of exposing the resin particles by mechanically cutting the film using a tool such as sand paper, or a method of exposing the resin particles by decomposing the film using a laser or the like is used.

Figure 2C:
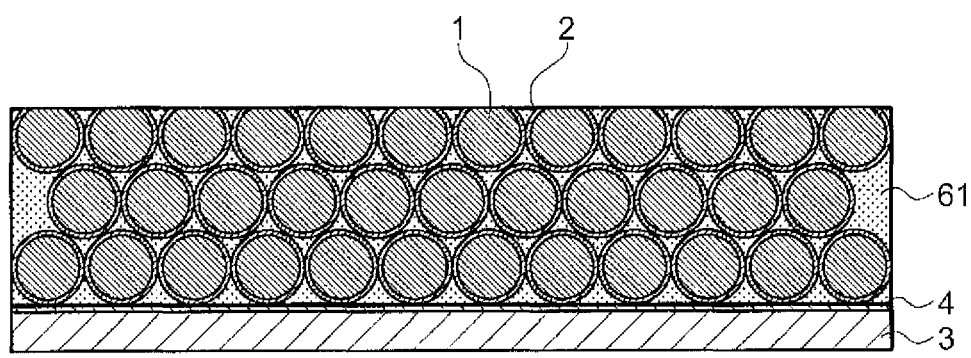

For example, in a case where the mechanical cutting method is used, some of resin particles which are present in an upper region of the resin particle layer (that is, a region of the resin particle layer on a side distant from the substrate) embedded in the polyimide film are cut together with the polyimide film present above the resin particles, and the cut resin particles are exposed from the surface of the polyimide film (refer to FIG. 2C).

Next, the resin particles are removed from the polyimide film, from which the resin particles are exposed, through the above-described treatment of removing the resin particles. The porous polyimide film from which the resin particles are removed is obtained (refer to FIG. 2D).

Figure 3A:
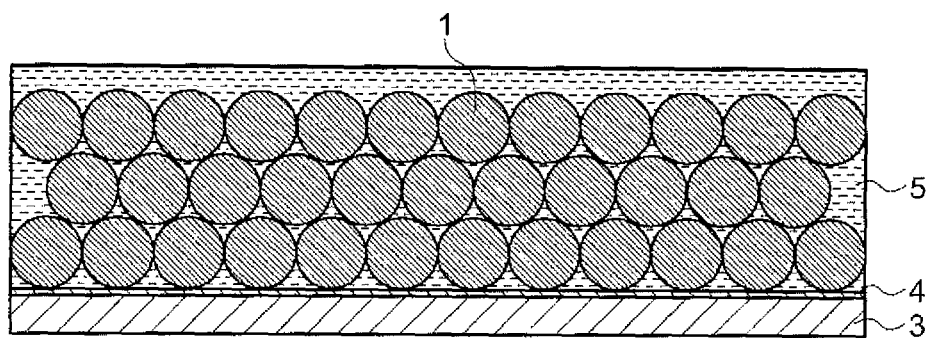
FIGS. 3A to 3C are process drawings showing still another example of the method of forming the porous polyimide film which is included in the porous film according to the exemplary embodiment.
Figure 3B:
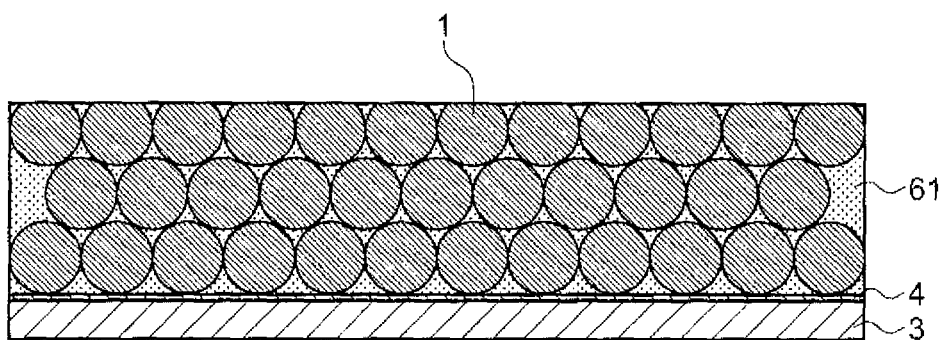

In a case where the film is formed on the substrate using the resin particle-dispersed polyimide precursor solution, the resin particle-dispersed polyimide precursor solution is applied to the substrate to form a coating film in which the resin particles are embedded (refer to FIG. 3A). Next, in the process of drying the coating film to form a film, in a case where a film including the polyimide precursor and the resin particles is formed without performing the treatment of exposing the resin particles, a film in which the resin particles are embedded may be formed. For example, in a case where the film in which the resin particles are embedded is heated, the film in the process of imidization (the polyimide film) is in a state where the resin particle layer is embedded. As the treatment of exposing the resin particles which is performed in the second step in order to increase the area ratio of the pores, the same treatment as the above-described treatment of exposing the resin particles may be adopted. The polyimide film present above the resin particles is also cut, and the resin particles are exposed from the surface of the polyimide film (refer to FIG. 3B).

Next, the resin particles are removed from the polyimide film, from which the resin particles are exposed, through the above-described treatment of removing the resin particles. The porous polyimide film from which the resin particles are removed is obtained (refer to FIG. 3C).

In the second step, the substrate which is used in the first step to form the above-described film may be peeled off from the film when the film is dried, when the polyimide precursor in the polyimide film is not likely to be dissolved in an organic solvent, or when the imidization of the film is completed.

Through the above-described steps, the porous polyimide film including the polyimide resin and the resin other than a polyimide resin is obtained. The porous polyimide film may be post-treated depending on the intended use.

Here, the imidization ratio of the polyimide precursor will be described.

Examples of a partially imidized polyimide precursor include precursors having repeating units represented by the following formulae (I-1), (I-2), and (I-3).

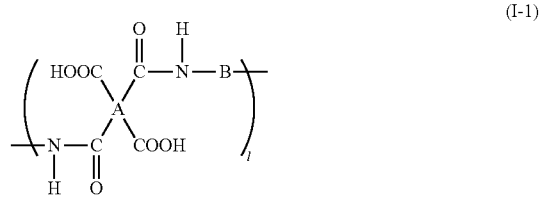

(I-1)

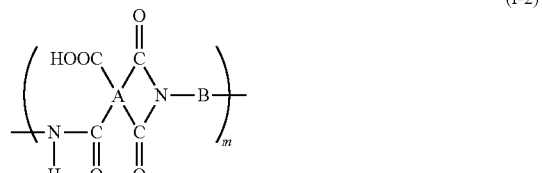

(I-2)

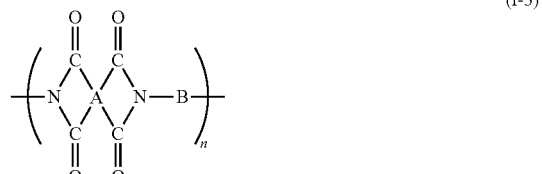

(I-3)

In the formulae (I-1), (I-2), and (I-3), A represents a tetravalent organic group, and B represents a divalent organic group. l represents an integer of 1 or more, and m and n each independently represent an integer of 0 or 1 or more.

A and B have the same definitions as those of A and B in the formula (I) described below.

The imidization ratio of the polyimide precursor denotes a ratio of the number (2n+m) of binding sites of the polyimide precursor (reaction sites between tetracarboxylic dianhydride and the diamine compound) where an imide ring is closed to the total number (2l+2m+2n) of binding sites of the polyimide precursor. That is, the imidization ratio of the polyimide precursor is represented by "(2n+m)/(2l+2m+2n)".

The imidization ratio (the value of "(2n+m)/(2l+2m+2n)") of the polyimide precursor is measured using the following method.

Measurement of Imidization Ratio of Polyimide Precursor

Preparation of Polyimide Precursor Sample (i) A polyimide precursor solution as a measurement target is applied to a silicon wafer in a thickness range from 1 μm to 10 μm to prepare a coating film sample.

(ii) The coating film sample is dipped in tetrahydrofuran (THF) for 20 minutes such that a solvent in the coating film sample is replaced with tetrahydrofuran (THF). The solvent for dipping is not limited to THF and may be selected from solvents in which the polyimide precursor is insoluble and which may be mixed with the solvent component included in the polyimide precursor solution. Specifically, an alcohol solvent such as methanol or ethanol, or an ether compound such as dioxane may be used.

(iii) The coating film sample is extracted from THF, and $N_2$ gas is blown to THF attached to the surface of the coating film sample to remove THF from the coating film sample. The coating film sample is dried under reduced pressure of 10 mmHg or lower in a range from 5° C. to 25° C. for 12 hours or longer to prepare a polyimide precursor sample.

Preparation of 100% Imidized Reference Sample (iv) Using the same method as in (i) described above, a polyimide precursor solution as a measurement target is applied to a silicon wafer to prepare a coating film sample.

(v) The coating film sample is heated at 380° C. for 60 minutes to perform an imidization reaction. As a result, a 100% imidized reference sample is prepared.

Measurement and Analysis (vi) Using a Fourier transform infrared spectrometer (FT-730, manufactured by Horiba Ltd.), infrared absorption spectra of the 100% imidized reference sample and the polyimide precursor sample are measured. In the 100% imidized reference sample, a ratio I' (100) of an imide bond-derived absorption peak (Ab' (1780 cm$^{-1}$)) present near 1780 cm$^{-1}$ to an aromatic ring-derived absorption peak (Ab' (1,500 cm$^{-1}$)) present near 1,500 cm$^{-1}$ is obtained.

(vii) By performing the same measurement on the polyimide precursor sample, a ratio I(x) of an imide bond-derived absorption peak (Ab (1780 cm$^{-1}$)) present near 1780 cm$^{-1}$ to an aromatic ring-derived absorption peak (Ab (1,500 cm$^{-1}$)) present near 1,500 cm$^{-1}$ is obtained.

Using the respective measured absorption peaks I' (100) and I(x), the imidization ratio of the polyimide precursor is calculated based on the following expressions.

Imidization Ratio of Polyimide Precursor=$I(x)/I'(100)$ $I'(100)=(Ab'(1{,}780\ cm^{-1}))/(Ab'(1{,}500\ cm^{-1}))$ $I'(x)=(Ab(1{,}780\ cm^{-1}))/(Ab(1{,}500\ cm^{-1}))$ This measurement of the imidization ratio of the polyimide precursor may be adopted for the measurement of the imidization ratio of an aromatic polyimide precursor. In a case where the imidization ratio of an aromatic polyimide precursor is measured, a peak derived from a structure having no change before and after the imidization reaction is used as an internal standard peak instead of the aromatic ring-derived absorption peak.

Polyimide Precursor Solution

The polyimide precursor solution is not particularly limited as long as a porous polyimide film that includes a resin other than a polyimide resin and an organic amine compound and that does not include a polar aprotic solvent is obtained using the polyimide precursor solution. From the viewpoint of preventing cracking, it is preferable that the polyimide precursor solution is obtained by dissolving a polyimide precursor and an organic amine compound in an aqueous solvent.

Hereinafter, each component of the polyimide precursor solution for obtaining the porous polyimide film will be described. A polyimide precursor solution obtained by dissolving a polyimide precursor and an organic amine compound in an aqueous solvent will be described as an example.

Polyimide Precursor

The polyimide precursor is a resin (polyamic acid) having a repeating unit represented by the formula (I).

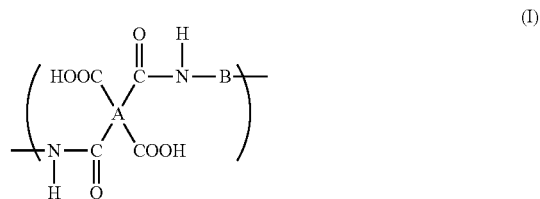

(In the formula (I), A represents a tetravalent organic group, and B represents a divalent organic group.)

Here, in the formula (I), the tetravalent organic group represented by A is a residue obtained by removing four carboxyl groups from tetracarboxylic dianhydride as a raw material.

On the other hand, the divalent organic group represented by B is a residue obtained by removing two amino groups from the diamine compound as a raw material.

That is, the polyimide precursor having a repeating unit represented by the formula (I) is a polymer obtained by polymerization of tetracarboxylic dianhydride and the diamine compound.

Examples of the tetracarboxylic dianhydride includes an aromatic compound and an aliphatic compound. Among these, an aromatic compound is preferable. That is, it is preferable that the tetravalent organic group represented by A in the formula (I) is an aromatic organic group.

Examples of the aromatic tetracarboxylic dianhydride include pyromellitic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyldiphenyl silane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxyphenoxy)diphenylsulfide dianhydride, 4,4'-bis (3,4-dicarboxyphenoxy)diphenyl sulfonedianhydride, 4,4'-bis (3,4-dicarboxyphenoxy)diphenyl propane dianhydride, 3,3',4,4'-perfluoroisopropylidene diphthalic dianhydride, 3,3',4,4'-biphenyl tetracarboxylic dianhydride, 2,3,3',4'-biphenyl tetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include: an aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutanetetracarboxylicdianhydride, 1,2,3,4-cyclopentane tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-di carboxylic dianhydride, or bicyclo[2,2,2]-oct-7-ene-2,3,5,6-tetracarboxylic dianhydride; and an aliphatic tetracarboxylic dianhydride having an aromatic ring such as 1,3,3a,4,5,9b-(hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtha-[1,2-c]furan-1,3- dione, or 1,3,3a,4,5,9b-hexahydro-8-methyl-5-(tetrahydro-2,5-dioxo-3-furanyl)-naphtho[1,2-c]furan-1,3-dione.

Among these, as the tetracarboxylic dianhydride, an aromatic tetracarboxylic dianhydride is preferable. Specifically, for example, pyromellitic dianhydride, 3,3',4,4'-biphenyl tetracarboxylic dianhydride, 2,3,3',4'-biphenyl tetracarboxylic dianhydride, 3,3',4,4'-biphenyl ether tetracarboxylic dianhydride, or 3,3',4,4'-benzophenone tetracarboxylic dianhydride is preferable, pyromellitic dianhydride, 3,3',4,4'-biphenyl tetracarboxylic dianhydride, or 3,3',4,4'-benzophenone tetracarboxylic dianhydride is more preferable, and 3,3',4,4'-biphenyl tetracarboxylic dianhydride is still more preferable.

Among these tetracarboxylic dianhydrides, one kind may be used alone, or two or more kinds may be used in combination.

In a case where two or more tetracarboxylic dianhydrides are used in combination, a combination of aromatic tetracarboxylic dianhydrides, a combination of aliphatic tetracarboxylic dianhydrides, or a combination of an aromatic tetracarboxylic dianhydride and an aliphatic tetracarboxylic dianhydride may be used.

On the other hand, the diamine compound is a diamine compound having two amino groups in a molecular structure thereof. Examples of the diamine compound includes an aromatic compound and an aliphatic compound. Among these, an aromatic compound is preferable. That is, it is preferable that the divalent organic group represented by B in the formula (I) is an aromatic organic group.

Examples of the diamine compound include: an aromatic diamine such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, or 4,4'-bis[4-(4-amino-2-trifluoromethyl)phenoxy]-octafluorobiphenyl; an aromatic diamine having two amino groups bonded to an aromatic ring and hetero atoms other than nitrogen atoms of the amino groups, such as diaminotetraphenyl thiophene; and an aliphatic or alicyclic diamine such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1,0$^{2.7}$]-undecylene dimethyldiamine, or 4,4'-methylenebis(cyclohexylamine);

Among these, as the diamine compound, an aromatic diamine compound is preferable. Specifically, for example, p-phenylenediamine, m-phenylenediamine, 4,4'-diaminodiphenylmethane, 4,4'-diaminodiphenylether, 3,4'-diaminodiphenylether, 4,4'-diaminodiphenylsulfide, or 4,4'-diaminodiphenylsulfone is preferable, and 4,4'-diaminodiphenylether or p-phenylenediamine is more preferable.

Among these diamine compounds, one kind may be used alone, or two or more kinds may be used in combination. In addition, in a case where two or more diamine compounds are used in combination, a combination of aromatic diamine compounds, a combination of aliphatic diamine compounds, or a combination of an aromatic diamine compound and an aliphatic diamine compound may be used.

The number average molecular weight of the polyimide precursor is preferably from 1,000 to 150,000, more preferably from 5,000 to 130,000, and still more preferably from 10,000 to 100,000.

In a case where the number average molecular weight of the polyimide precursor is in the above-described range, deterioration in the solubility of the polyimide precursor in a solvent is prevented, and film forming properties are easily secured.

The number average molecular weight of the polyimide precursor is measured using gel permeation chromatography (GPC) under the following measurement conditions:
Column: Tosoh TSKgel α-M (7.8 mm, I.D.×30 cm)
Eluent: dimethylformamide (DMF)/30 mM LiBr/60 mM phosphoric acid
Flow rate: 0.6 mL/min
Injection amount: 60 μL
Detector: a differential refractometer (RI)

The content (concentration) of the polyimide precursor is from 0.1% by weight to 40% by weight, preferably from 0.5% by weight to 25% by weight, and more preferably from 1% by weight to 20% by weight with respect to the total weight of the polyimide precursor solution.

Organic Amine Compound

The organic amine compound is a compound which forms an amine salt with the polyimide precursor (a carboxyl group thereof) to improve the solubility in the aqueous solvent thereof and which also functions as an imidization promoter. Specifically, it is preferable that the organic amine compound is an amine compound having a molecular weight of 170 or lower. It is preferable that the organic amine compound is a compound other than the diamine compound which is the raw material of the polyimide precursor.

It is preferable that the organic amine compound is a water-soluble compound. "Water-soluble" denotes that 1% by weight or higher of a target material is soluble in water at 25° C.

Examples of the organic amine compound include a primary amine compound, a secondary amine compound, and a tertiary amine compound.

Among these, as the organic amine compound, at least one (in particular, a tertiary amine compound) selected from the group consisting of a secondary amine compound and a tertiary amine compound is preferable. In a case where a tertiary amine compound or a secondary amine compound (in particular, a tertiary amine compound) is used as the organic amine compound, the solubility of the polyimide precursor in the solvent is likely to increase, film forming properties are likely to be improved, and the storage stability of the polyimide precursor solution is likely to be improved.

In addition, examples of the organic amine compound include a monovalent amine compound and a divalent or higher polyvalent amine compound. In a case where a divalent or higher polyvalent amine compound is used, a pseudo-crosslinked structure is likely to be formed between molecules of the polyimide precursor, and the storage stability of the polyimide precursor solution is likely to be improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino) ethanol, and morpholine.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

From the viewpoints of the pot life of the polyimide precursor solution and the film thickness uniformity, a tertiary amine compound is preferable. From these viewpoints, it is more preferable that the organic amine compound is at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

Here, from the viewpoint of film forming properties, it is also preferable that the organic amine compound is an amine compound which has an aliphatic cyclic structure or an aromatic cyclic structure having a nitrogen-containing heterocyclic structure (hereinafter, referred to as "nitrogen-containing heterocyclic amine compound"). It is more preferable that the nitrogen-containing heterocyclic amine compound is a tertiary amine compound.

Examples of the nitrogen-containing heterocyclic amine compound include isoquinolines (amine compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), piperidines (amine compounds having a piperidine skeleton), triazines (amine compounds having a triazine skeleton), imidazoles (amine compounds having an imidazole skeleton), morpholines (amine compounds having a morpholine skeleton), polyaniline, polypyridine, and polyamine.

From the viewpoint of film forming properties, it is preferable that the nitrogen-containing heterocyclic amine compound is at least one selected from the group consisting of morpholines, pyridines, piperidines, and imidazoles. Among these, it is more preferable that the nitrogen-containing heterocyclic amine compound is at least one selected from the group consisting of N-methylmorpholine, N-methylpiperidine, pyridine, 1,2-dimethylimidazole, 2-ethyl-4-methylimidazole, and picoline.

Among these, it is preferable that the organic amine compound is a compound having a boiling point of 60° C. or higher (preferably from 60° C. to 200° C., and more preferably from 70° C. to 150° C.). In a case where the boiling point of the organic amine compound is 60° C. or higher, the volatilization of the organic amine compound from the polyimide precursor solution is prevented during storage, and deterioration in the solubility of the polyimide precursor in the solvent is likely to be prevented.

The content of the organic amine compound is from 50% by mol to 500% by mol, preferably from 80% by mol to 250% by mol, and more preferably from 90% by mol to 200% by mol with respect to the amount of carboxyl groups (—COOH) of the polyimide precursor in the polyimide precursor solution.

In a case where the content of the organic amine compound is in the above-described range, the solubility of the polyimide precursor in the solvent is likely to increase, and film forming properties are likely to be improved. In addition, the storage stability of the polyimide precursor solution is likely to be improved.

Among these organic amine compound, one kind may be used alone, or two or more kinds may be used in combination.

Aqueous Solvent

The aqueous solvent includes water. Specifically, it is preferable that the aqueous solvent includes 50% by weight or higher of water with respect to the total weight of the aqueous solvent. Examples of the water include distilled water, ion exchange water, ultrafiltered water, and pure water.

The content of the water is preferably from 50% by weight to 100% by weight, more preferably from 70% by weight to 100% by weight, and still more preferably from 80% by weight to 100% by weight with respect to the total weight of the aqueous solvent.

In a case where the aqueous solvent includes a solvent other than water, examples of the solvent other than water includes a water-soluble organic solvent. As the solvent other than water, a water-soluble organic solvent is preferable from the viewpoints of the transparency, mechanical strength, and the like of a polyimide molded article. In particular, from the viewpoints of various properties of a polyimide molded article such as transparency, mechanical strength, heat resistance, electrical properties, and solvent resistance, it is preferable that the aqueous solvent does not include a polar aprotic solvent. Here, "water-soluble" denotes that 1% by weight or higher of a target material is soluble in water at 25° C.

Among these water-soluble organic solvents, one kind may be used alone, or two or more kinds may be used in combination.

A water-soluble ether solvent is a water-soluble solvent having an ether bond in one molecule. Examples of the water-soluble ether solvent include tetrahydrofuran (THF), dioxane, trioxane, 1,2-dimethoxyethane, diethylene glycol dimethyl ether, and diethylene glycol diethyl ether. Among these, tetrahydrofuran or dioxane is preferable as the water-soluble ether solvent.

A water-soluble ketone solvent is a water-soluble solvent having a ketone group in one molecule. Examples of the water-soluble ketone solvent include acetone, methyl ethyl ketone, and cyclohexanone. Among these, acetone is preferable as the water-soluble ketone solvent.

A water-soluble alcohol solvent is a water-soluble solvent having an alcoholic hydroxyl group in one molecule. Examples of the water-soluble alcohol solvent include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-buten-1,4-diol, 2-methyl-2,4-pentanediol, glycerin, 2-ethyl-2-hydroxymethyl-1,3-propanediol, and 1,2,6-hexanetriol. Among these, as the water-soluble alcohol solvent, methanol, ethanol, 2-propanol, ethylene glycol, ethylene glycol monoalkyl ether, propylene glycol, propylene glycol monoalkyl ether, diethylene glycol, or diethylene glycol monoalkyl ether is preferable.

The polar aprotic solvent which is not substantially included in the porous polyimide film is a solvent having a boiling point of from 150° C. to 300° C. and having a dipole moment of from 3.0 D to 5.0 D. Specific examples of the polar aprotic solvent include N-methyl-2-pyrrolidone (NMP), N,N-dimethylformamide (DMF), N,N-dimethylacetamide (DMAc), N,N-diethylacetamide (DEAc), dimethylsulfoxide (DMSO), hexamethylphosphoramide (HMPA), N-methylcaprolactam, N-acetyl-2-pyrrolidone, N,N-dimethylimidazolidinone (DMI), and 1,3-dimethyl-imidazolidone.

In a case where the aqueous solvent includes a solvent other than water, the boiling point of the solvent to be used in combination is 270° C. or lower, preferably from 60° C. to 250° C., and more preferably from 80° C. to 230° C. In a case where the boiling point of the solvent to be used in combination is in the above-described range, the solvent other than water is not likely to remain in a polyimide molded article, and the mechanical strength of the obtained polyimide molded article is likely to be high.

Here, the solubility of the polyimide precursor in the solvent is controlled based on the content of water, and the kind and amount of the organic amine compound. In a case where the content of water is low, the polyimide precursor is likely to be dissolved in a region where the content of the organic amine compound is low. On the other hand, in a case where the content of water is high, the polyimide precursor is likely to be dissolved in a region where the content of the organic amine compound is high. In a case where the organic amine compound is highly hydrophilic, for example, has a hydroxyl group, the polyimide precursor is likely to be dissolved in a region where the content of water is high.

In order to prepare the polyimide precursor, a polyimide precursor which is synthesized using an organic solvent such as a polar aprotic solvent (for example, N-methylpyrrolidone (NMP)) may be added to a poor solvent such as water or alcohol, deposited, and separated.

Other Additives

In the method of forming a porous film according to the exemplary embodiment, the polyimide precursor solution may include a catalyst for promoting the imidization reaction or a leveling agent for improving the quality of the film.

As the catalyst for promoting the imidization reaction, for example, a dehydrating agent such as an acid anhydride, or an acid catalyst such as a phenol derivative, a sulfonic acid derivative, or a benzoic acid derivative may be used.

In addition, depending on the intended use of the porous polyimide film, the polyimide precursor solution may include, for example, a conductive material (which is conductive (for example, a volume resistivity of lower than $10^7$ $\Omega \cdot cm$) or semiconductive (for example, a volume resistivity of from $10^7$ $\Omega \cdot cm$ to $10^{13}$ $\Omega \cdot cm$)) to impart conductivity.

Examples of the conductive material include: carbon blacks (for example, an acidic carbon black having a pH value of 5.0 or lower); metals (for example, aluminum or nickel); metal oxides (for example, yttrium oxide or tin oxide); and ion-conductive materials (for example, potassium titanate or LiCl). Among these conductive materials, one kind may be used alone, or two or more kinds may be used in combination.

In addition, depending on the intended use of the porous polyimide film, the polyimide precursor solution may include inorganic particles which are added to improve the mechanical strength. Examples of the inorganic particles include particulate materials such as silica powder, alumina powder, barium sulfate powder, titanium oxide powder, mica, or talc. In addition, the polyimide precursor solution may include $LiCoO_2$, $LiMn_2O$, or the like which is used as an electrode of a lithium ion battery.

Method of Preparing Polyimide Precursor Solution

A method of preparing the polyimide precursor solution is not particularly limited. For example, the following method may be used.

For example, a method of obtaining a polyimide precursor solution by polymerizing tetracarboxylic dianhydride and a diamine compound in an aqueous solvent in the presence of an organic amine compound to prepare a resin (polyimide precursor) may be used.

According to this method, the aqueous solvent is used. Therefore, the productivity is high and the polyimide precursor solution is prepared in one stage from the viewpoint of simplifying the process.

In another example of the method, tetracarboxylic dianhydride and a diamine compound are polymerized in an organic solvent such as a polar aprotic solvent (for example, N-methylpyrrolidone (NMP)) to prepare a resin (polyimide precursor), and the resin (polyimide precursor) is poured into an aqueous solvent such as water or alcohol to be deposited. Next, the polyimide precursor and an organic amine compound are dissolved in the aqueous solvent to obtain a polyimide precursor solution.

The example in which the polyimide precursor solution is obtained by dissolving a polyimide precursor and an organic amine compound in an aqueous solvent has been described. However, the invention is not limited to this example. For example, a method of preparing a polyimide precursor solution in which an organic amine compound is not dissolved may be used. Specifically, in this method, tetracarboxylic dianhydride and a diamine compound are polymerized in an aqueous mixed solvent of two or more solvents selected from a water-soluble ether solvent, a water-soluble ketone solvent, a water-soluble alcohol solvent, and water (for example, a mixed solvent of a water-soluble ether solvent and water, a mixed solvent of a water-soluble ketone solvent and water, or a combination of water-soluble alcohol solvents) to prepare a resin (polyimide precursor), thereby obtaining a polyimide precursor solution.

Porous Polyimide Film

Next, the porous polyimide film will be described. The porous polyimide film includes an organic amine compound and a resin other than a polyimide resin and does not include a polar aprotic solvent.

From the viewpoints of, for example, preventing cracking and controlling the shape of pores, the content of the organic amine compound is 0.001% by weight or higher with respect to the total weight of the porous polyimide film. By controlling the content of the organic amine compound to be in the above-described range, the cracking of the porous polyimide film is likely to be prevented. Due to the same reason, the lower limit of the content of the organic amine compound is preferably 0.003% by weight or higher, and more preferably 0.005% by weight or higher. In addition, the upper limit of the content of the organic amine compound is preferably 1.0% by weight or lower, and more preferably 0.9% by weight or lower.

The content of the organic amine compound in the porous polyimide film may be controlled, for example, by controlling the amount of the organic amine compound used in the first step among the above-described steps of forming a porous polyimide film, the temperature conditions of the heating temperature in the second step, and the like.

From the viewpoints of, for example, preventing cracking and controlling the shape of pores, the content of the resin other than a polyimide resin is preferably from 0.005% by weight to 1% by weight with respect to the total weight of the porous polyimide film. Due to the same reason, the lower limit of the content of the resin other than a polyimide resin is preferably 0.008% by weight or higher, and more preferably 0.01% by weight or higher. In addition, the upper limit of the content of the resin other than a polyimide resin is preferably 1.0% by weight or lower, and more preferably 0.9% by weight or lower.

The content of the resin other than a polyimide resin in the porous polyimide film may be controlled, for example, by controlling the amount of the resin particles used in the first step among the above-described steps of forming a porous polyimide film, the conditions of removing the resin particles in the second step, and the like.

A state where the resin other than a polyimide resin is present in the porous polyimide film is not particularly limited. For example, the resin other than a polyimide resin may be present at least either in the porous polyimide film or on a surface of the porous polyimide film (including surfaces of the pores of the porous polyimide film).

The porous polyimide film does not substantially include a polar aprotic solvent. As described above, "not substantially including" denotes that the content of the polar aprotic solvent is 0.001% by weight or lower. It is more preferable that the polar aprotic solvent is not detected by pyrolysis gas chromatography-mass spectrometry (GC-MS).

Even in a case where the polar aprotic solvent is used in the process of forming the porous polyimide film, the content of the polar aprotic solvent may be controlled by controlling the amount thereof used, the temperature conditions of the heating temperature in the second step, and the like. However, it is preferable that the polar aprotic solvent is not used.

Verification of Contents of Organic Amine Compound, Resin Other Than Polyimide Resin, and Polar Aprotic Solvent The presence and content of each of the organic amine compound, the polar aprotic solvent, and the resin other than a polyimide resin in the porous polyimide film may be measured, for example, by analyzing and determining components detected by pyrolysis gas chromatography-mass spectrometry (GC-MS). Specifically, the measurement is performed as follows.

Components included in the porous polyimide film are analyzed using a gas chromatography-mass spectrometer (GCMS QP-2010, manufactured by Shimadzu Corporation) equipped with a free-fall pyrolyzer (PY-2020D, manufactured by Frontier Laboratories Ltd.). The organic amine compound and the polar aprotic solvent are determined at a pyrolysis temperature of 400° C. after precisely weighing 0.40 mg of the porous polyimide film. The resin component other than a polyimide resin is determined at a pyrolysis temperature of 600° C. after precisely weighing 0.20 mg of the porous polyimide film. Regarding the resin other than a polyimide resin, a chromatogram at a pyrolysis temperature of 400° C. and a chromatogram at a pyrolysis temperature of 600° C. are compared to each other, and a larger amount of a styrene monomer obtained by depolymerization of polystyrene is detected at a pyrolysis temperature of 600° C. than at a pyrolysis temperature of 400° C. As a result, it is verified that the result is derived from a polymer.

Pyrolyzer: PY-2020D, manufactured by Frontier Laboratories Ltd.
Gas chromatography-mass spectrometer: GCMS QP-2010, manufactured by Shimadzu Corporation
Pyrolysis temperature: 400° C., 600° C.
Gas chromatography introduction temperature: 280° C.
Injection method:split ratio=1:50
Column: manufactured by Frontier Laboratories Ltd., Ultra ALLOY-5, 0.25 μm, 0.25 μm ID, 30 m
Gas chromatography temperature program: 40° C.→20° C./min→holding at 280° C. for 10 min
Mass range: EI, m/z=29–600 (the content of the resin other than a polyimide resin)

Properties of Porous Polyimide Film

The porous polyimide film has pores which have a substantially spherical shape and are linked to each other. In this specification, the meaning of "the shape of pores is substantially spherical" includes both a case where the shape of pores is spherical and a case where the shape of pores is substantially spherical. Specifically, "the shape of pores is substantially spherical" denotes that the proportion of pores, in which a ratio (long diameter/short diameter) of a long diameter to a short diameter, in the porous polyimide film is from 1 to 2 is 50% or higher. As the proportion of the pores increases, the proportion of spherical pores increases. The proportion of pores in which a ratio (long diameter/short diameter) of a long diameter to a short diameter is from 1 to 2 is preferably from 50% to 100%, and more preferably from 55% to 100%. As the ratio of a long diameter to a short diameter of a pore becomes closer to 1, the shape of the pore is more likely to be spherical. Since the pores having a substantially spherical shape are linked to each other, the shape of linked portions is estimated by extrapolation from portions which form walls.

In addition, in a case where the porous polyimide film is applied to, for example, a battery separator of a lithium ion battery, the disruption of ion flow is prevented, and thus the formation of lithium dendrite is likely to be prevented. In addition, in a case where the porous polyimide film is used as a filter, the filtering accuracy (for example, the uniformity in the size of a material included in a filtrate) is improved.

The porous polyimide film is not particularly limited, and it is preferable that the porosity thereof is 30% or higher. The porosity is preferably 40% or higher and more preferably 50% or higher. The upper limit of the porosity is not particularly limited and is preferably in a range of 90% or lower.

Figure 1D:
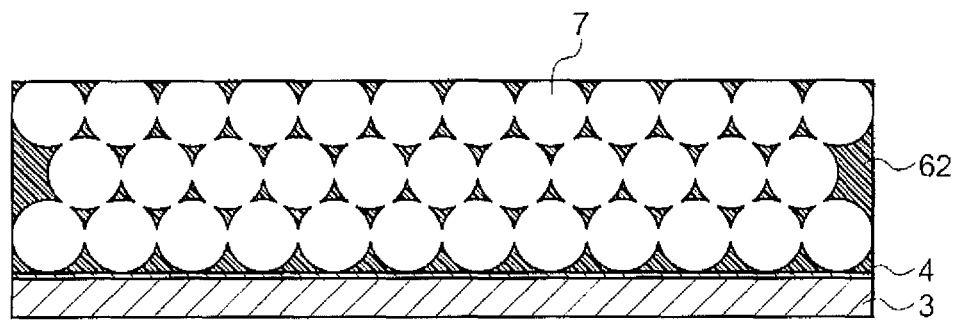
Figure 2D:
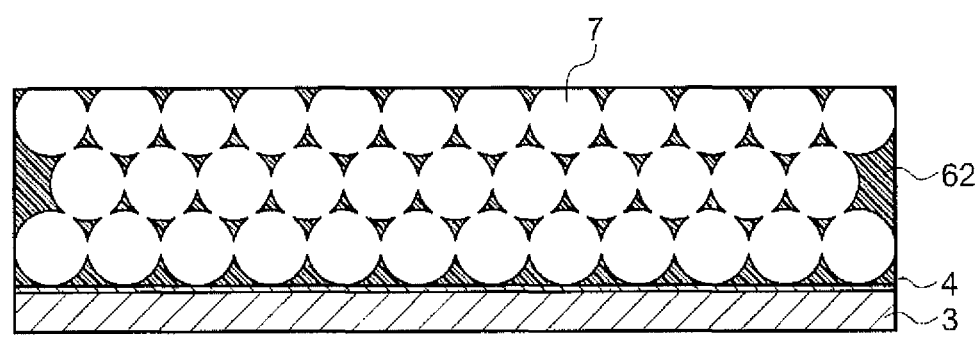
Figure 3C:
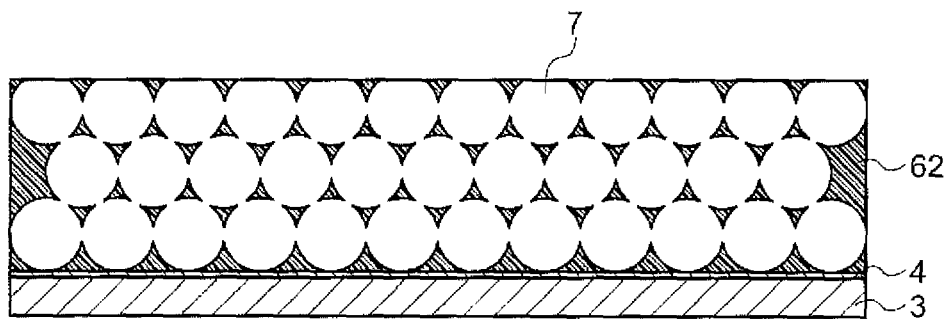

In addition, it is preferable that the pores are linked to each other (refer to FIGS. 1D, 2D, and 3C). For example, the pore diameter of portions where the pores are linked to each other is preferably from 1/100 to 1/2, more preferably from 1/50 to 1/3, and still more preferably from 1/20 to 1/4 with respect to the maximum pore diameter. Specifically, the average pore diameter of portions where the pores are linked to each other is preferably from 5 nm to 1,500 nm.

The average pore diameter is not particularly limited and is in a range from 0.01 μm to 2.5 μm, preferably in a range from 0.05 μm to 2.0 μm, more preferably in a range from 0.1 μm to 1.5 μm, and still more preferably in a range from 0.15 μm to 1.0 μm.

In the porous polyimide film, a ratio of a maximum diameter to a minimum diameter in the pores (a ratio of a maximum pore diameter to a minimum pore diameter) is from 1 to 2. The ratio is preferably from 1 to 1.9 and more preferably from 1 to 1.8. Even in this range, it is still more preferable that the ratio is close to 1. In a case where the ratio is in the above-described range, a variation in the pore diameter is reduced. In addition, in a case where the porous polyimide film according to the exemplary embodiment is applied to, for example, a battery separator of a lithium ion battery, the disruption of ion flow is prevented, and the formation of lithium dendrite is likely to be prevented.

"The ratio of a maximum diameter to a minimum diameter in the pores" is expressed by a value obtained by dividing a maximum diameter by a minimum diameter in the pores (that is, a maximum pore diameter/a minimum pore diameter).

The maximum pore diameter, the minimum pore diameter, the average pore diameter, the average pore diameter of portions where the pores are linked to each other, and the long diameters and short diameters of the pores are values obtained by observation and measurement using a scanning electron microscope (SEM). Specifically, first, the porous polyimide film is cut to prepare a measurement sample. This measurement sample is observed and measured using VE SEM (manufactured by Keyence Corporation) and image processing software as a standard equipment thereof. The observation and the measurement are performed on each of 100 pore portions in a cross-section of the measurement sample, and the average diameter, minimum diameter, maximum diameter, and arithmetic average diameter thereof are obtained. In a case where the shape of a pore is not spherical, the length of a longest portion is set as a diameter. A long diameter and a short diameter of each of the pore portions are observed and measured using VE SEM (manufactured by Keyence Corporation) and image processing software as a standard equipment thereof to calculate a ratio (long diameter/short diameter).

The thickness of the porous polyimide film is not particularly limited and is preferably 15 μm to 500 μm.

Layer Structure of Porous Film

Next, a layer structure of the porous film will be described.

The porous film according to the exemplary embodiment is not particularly limited as long as it includes at least one porous polyimide film (specific porous polyimide film) that includes an organic amine compound and a resin other than a polyimide resin and that does not include a polar aprotic solvent, in which a content of the organic amine compound is 0.001% by weight or higher with respect to the total weight of the porous polyimide film. For example, the specific porous polyimide film may have a single-layer structure or a multi-layer structure including two or more layers.

In addition, the porous film according to the exemplary embodiment may have a structure in which the specific porous polyimide film and a porous material (for example, at least either a porous polyolefin film or non-woven fabric) are laminated.

The layer structure of the porous film according to the exemplary embodiment is not particularly limited as long as it includes at least one specific porous polyimide film, and may be determined according to the purpose.

A lamination method for obtaining the above-described laminate structure of the porous film according to the exemplary embodiment is not particularly limited, and examples thereof include a well-known lamination method such as a method of laminating layers using an adhesive.

Applications of Porous Film

Examples of applications to which the porous film according to the exemplary embodiment is applicable include: a battery separator of a lithium battery or the like; a separator for an electrolytic capacitor; an electrolyte film of a fuel cell or the like; a battery electrode material; a gas or liquid separation membrane; a low dielectric constant material; and various filters.

In a case where the porous film according to the exemplary embodiment is applied to, for example, a battery separator, for example, a variation in the ion current distribution of lithium ions is prevented. Due to this effect and the like, it is thought that the formation of lithium dendrite is prevented. The reason for this is presumed to be that variations in the shape of the pores in the porous polyimide film included in the porous film according to the exemplary embodiment, the pore diameter thereof, and the presence distributions thereof are reduced.

In addition, in a case where the porous film according to the exemplary embodiment is applied to, for example, a battery electrode material, it is thought that the opportunity of contact with an electrolytic solution increases and the battery capacity increases. The reason for this is presumed that, regarding a material such as carbon black for an electrode which is included in the porous polyimide film, the amount of the material exposed from the surfaces of the pores of the porous polyimide film or from the surface of the film is increased.

Further, for example, a film in which the pores of the porous polyimide film are filled with, for example, an ionic gel obtained by gelation of a so-called ionic liquid may be used as an electrolyte film. Using the method of forming a porous film according to the exemplary embodiment, the process is simplified. Therefore, it is thought that an electrolyte film may be obtained at a lower cost.

EXAMPLES

Hereinafter, the invention will be described in more detail using examples but is not limited to these examples. In the following description, unless specified otherwise, "part (s)" and "%" represent "part (s) by weight" and "% by weight".

Preparation of Polyimide Precursor "Water" Solution (PAA-1)

900 g of water is put into a flask equipped with a stirring rod, a thermometer, and a dropping funnel. 27.28 g (252.27 mmol) of p-phenylenediamine (molecular weight: 108.14) and 50.00 g (494.32 mmol) of N-methylmorpholine (organic amine compound) are added to the flask, and the components are stirred and dispersed at 20° C. for 10 minutes. Further, 72.72 g (247.16 mmol) of 3,3',4,4'-biphenyl tetracarboxylic dianhydride (molecular weight: 294.22) is added to this solution, and then while maintaining the reaction temperature at 20° C., the solution is stirred for 24 hours to dissolve the components and to perform a reaction. As a result, a polyimide precursor "water" solution (PAA-1) is obtained.

Preparation of Polyimide Precursor "Water/Isopropanol" Solution (PAA-2)

800 g of water and 100 g of isopropanol are put into a flask equipped with a stirring rod, a thermometer, and a dropping funnel. 39.5 g (197.3 mmol) of 4,4'-diaminodiphenylether (molecular weight: 200.24) and 40.5 g (400 mmol) of N-methylmorpholine (organic amine compound) are added to the flask, and the components are stirred and dispersed at 20° C. for 10 minutes. Further, 57.5 g (195.1 mmol) of 3,3',4,4'-biphenyl tetracarboxylic dianhydride (molecular weight: 294.22) is added to this solution, and then while maintaining the reaction temperature at 20° C., the solution is stirred for 24 hours to dissolve the components and to perform a reaction. As a result, a polyimide precursor "water/isopropanol" solution (PAA-2) is obtained.

Preparation of Polyimide Precursor "N-Methylpyrrolidone" Solution (RPAA-1)

900 g of N-methylpyrrolidone is put into a flask equipped with a stirring rod, a thermometer, and a dropping funnel. Here, 39.5 g (197.3 mmol) of 4,4'-diaminodiphenylether (molecular weight: 200.24) and 42.6 g (195.1 mmol) of pyromellitic dianhydride (molecular weight: 218.12) are added to the solution, and while maintaining the reaction temperature at 20° C., the solution is stirred for 24 hours to dissolve the components and to perform a reaction. As a result, a polyimide precursor "N-methylpyrrolidone" solution (RPAA-1) is obtained.
Preparation of Polyimide Precursor "Water/Isopropanol" Solution (PAA-3)

500 g of the polyimide precursor "N-methylpyrrolidone" solution (RPAA-1) is added dropwise to 3,000 g of water while stirring them, and a polyimide precursor is deposited, separated by filtration, and sufficiently washed with water. 30 g of the polyimide precursor solid is added to 243 g of water and 27 g of isopropanol, 16 g of 2-dimethylaminoethanol is further added thereto, and the components are stirred and dissolved. As a result, a polyimide precursor "water/isopropanol" solution (PAA-3) is obtained.
Preparation of Polyimide Precursor "Water/Isopropanol" Solution (PAA-4)

500 g of the polyimide precursor "N-methylpyrrolidone" solution (RPAA-1) is added dropwise to 3,000 g of water while stirring them, and a polyimide precursor is deposited, separated by filtration, and sufficiently washed with water. 30 g of the polyimide precursor solid is added to 243 g of water and 27 g of isopropanol, 15 g of 1,2-dimethylimidazole (DMIz) is further added thereto, and the components are stirred and dissolved. As a result, a polyimide precursor "water/isopropanol" solution (PAA-4) is obtained.
Preparation of Polyimide Precursor "Water/N-Methylpyrrolidone" Solution (PAA-5)

500 g of the polyimide precursor "N-methylpyrrolidone" solution (RPAA-1) is added dropwise to 3,000 g of water while stirring them, and a polyimide precursor is deposited. 30 g of the polyimide precursor solid is added to 243 g of water and 27 g of N-methylpyrrolidone, 15 g of 2-dimethylaminoethanol is further added thereto, and the components are stirred and dissolved. As a result, a polyimide precursor "water/N-methylpyrrolidone" solution (PAA-5) is obtained.
Preparation of Polyimide Precursor "N-Methylpyrrolidone" Solution (RPAA-2)

1 part by weight of 1,2-dimethylimidazole (DMIz) is added to 100 parts by weight of RPAA-1, and the solution is sufficiently stirred and homogenized (substantially homogeneous). As a result, a polyimide precursor "N-methylpyrrolidone" solution (RPAA-2) is obtained.

TABLE 1

| PI Precursor Solution | Solvent | Tetracarboxylic Dianhydride | Diamine Compound | Organic Amine Compound |
|---|---|---|---|---|
| PAA-1 | Water | BPDA | PDA | MMO |
| PAA-2 | Water/IPA | BPDA | ODA | MMO |
| PAA-3 | Water/IPA | PMDA | ODA | DMAEt |
| PAA-4 | Water/IPA | PMDA | ODA | DMIz |
| PAA-5 | Water/NMP | PMDA | ODA | DMAEt |
| RPAA-1 | NMP | PMDA | ODA | — |
| RPAA-2 | NMP | PMDA | ODA | DMIz |

Example 1

10 parts of a non-crosslinked polymethyl methacrylate-styrene copolymer (FS-102E, manufactured by Nipponpaint Co., Ltd.) having an average particle diameter of 0.1 μm and 1 part of a polyvinyl butyral resin (S-LEC SV-02, manufactured by Sekisui Chemical Co., Ltd.) are added to 30 parts of ethanol, and the solution is stirred on a web rotor to prepare a dispersion solution. This dispersion solution is applied to a glass substrate to form a coating film having a thickness of 30 μm after drying on the glass substrate, and this coating film is dried at 90° C. for 1 hour to form a resin particle layer.

The polyimide precursor "water" solution (PAA-1) is diluted to 10 times, is applied to the resin particle layer, and then is defoamed under reduced pressure. As a result, the polyimide precursor "water" solution (PAA-1) is impregnated into pores between the resin particles. The film is dried overnight at room temperature (25° C.; hereinafter, the same shall be applied) and is wiped with water such that a surface of the resin particle layer is exposed. As a result, a residual polyimide precursor is removed from the resin particle layer. This film is heated at 120° C. for 1 hour, is peeled off from the glass substrate, and is dipped in tetrahydrofuran (THF) for 30 minutes to elute the resin particles thereinto. After dried, the film is heated from room temperature to 270° C. at a speed of 10° C./min, is held at 270° C. for 1 hour, and is cooled to room temperature. As a result, a porous polyimide film (PIF-1) is obtained. A porous film is obtained using this porous polyimide film (PIF-1) having a single-layer structure.

Gas components produced from the obtained porous film are measured by pyrolysis gas chromatography-mass spectrometry (hereinafter, referred to as "GC-MS").

Comparative Example 1

The polyimide precursor "N-methylpyrrolidone" solution (RPAA-1) is diluted to 10 times and is applied to the resin particle layer which is prepared using the same method as in Example 1. However, the resin particles are dissolved in the solution. This film is heated at 120° C. for 1 hour, is peeled off from the glass substrate, and is dipped in THF for one hour to elute the resin thereinto. After dried, the film is heated from room temperature to 270° C. at a speed of 10° C./min, is held at 270° C. for 1 hour, and is cooled to room temperature. As a result, a porous polyimide film (RPIF-1) is obtained. A porous film is obtained using this porous polyimide film (RPIF-1) having a single-layer structure.

However, the pore diameter is in a range from 0.05 μm to 1.07 μm, the distribution thereof is wide, and the shape of the pores is amorphous. The reason for this is thought to be that the non-crosslinked resin particles are dissolved, and the shape thereof is not able to be maintained.

Gas components produced from the obtained porous polyimide film are measured by GC-MS.

Example 2

A porous polyimide film (PIF-2) is obtained using the same method as in Example 1, except that: the polyimide precursor "water" solution (PAA-1) is diluted to 10 times, is applied to the resin particle layer which is prepared using the same method as in Example 1; and the final firing temperature is changed to 310° C. A porous film is obtained using this porous polyimide film (PIF-2) having a single-layer structure.

Gas components produced from the obtained porous film are measured by GC-MS.

Example 3

The polyimide precursor "water/isopropanol" solution (PAA-2) is diluted to 10 times, a non-crosslinked polymethyl methacrylate-styrene copolymer (FS-102E, manufactured by Nipponpaint Co., Ltd.) having an average particle diameter of 0.1 µm is added thereto such that a weight ratio of the polyimide precursor solid to the resin particle solid is 25:75 (100:300), and the solution is stirred on a web rotor to prepare a dispersion solution. This dispersion solution is applied to a glass substrate to form a coating film having a thickness of 30 µm after drying on the glass substrate, and this coating film is dried at room temperature for 1 hour. The film is peeled off from the glass substrate and is dipped in tetrahydrofuran for 30 minutes. After dried at 90° C. for 1 hour, the film is heated from 90° C. to 270° C. at a speed of 10° C./min, is held at 270° C. for 1 hour, and is cooled to room temperature. As a result, a porous polyimide film (PIF-3) is obtained. A porous film is obtained using this porous polyimide film (PIF-3) having a single-layer structure.

Gas components produced from the obtained porous film are measured by GC-MS.

Example 4

A porous polyimide film (PIF-4) is obtained using the same method as in Example 2, except that the polyimide precursor "water/isopropanol" solution (PAA-3) is used. A porous film is obtained using this porous polyimide film (PIF-4) having a single-layer structure.

Gas components produced from the obtained porous film are measured by GC-MS.

Example 5

A porous polyimide film (PIF-5) is obtained using the same method as in Example 3, except that: the polyimide precursor "water/isopropanol" solution (PAA-4) is used; and toluene is used to remove the resin particles. A porous film is obtained using this porous polyimide film (PIF-5) having a single-layer structure.

Gas components produced from the obtained porous film are measured by GC-MS.

Example 6

A porous polyimide film (PIF-6) is obtained using the same method as in Example 3, except that: the polyimide precursor "water/N-methylpyrrolidone" solution (PAA-5) is used; toluene is used to remove the resin particles; and the final heating temperature is changed to 250° C. and the heating time is changed to 1 hour. A porous film is obtained using this porous polyimide film (PIF-6) having a single-layer structure.

N-methylpyrrolidone has a high boiling point and thus is not sufficiently removed by drying at room temperature. Therefore, the pore diameter is larger than that in the case of isopropanol.

Comparative Example 2

A porous polyimide film (RPIF-2) is obtained using the same method as in Example 6, except that the polyimide precursor "N-methylpyrrolidone" solution (RPAA-2) is used. A porous film is obtained using this porous polyimide film (RPIF-2) having a single-layer structure.

However, the pore diameter is in a range from 0.05 µm to 1.3 µm, the distribution thereof is wide, and the shape of the pores is amorphous. The reason for this is thought to be that the non-crosslinked resin particles are dissolved, and the shape thereof is not able to be maintained.

Gas components produced from the porous polyimide film are measured by GC-MS.

Example 7

Preparation of Resin Particle Dispersion
Preparation of Resin Particle Dispersion (1)

900 parts by weight of styrene, 100 parts by weight of butyl methacrylate, 15.7 part by weight of dodecanethiol, 15.8 parts by weight of a surfactant DOWFAX2A1 (47% solution, manufactured by The Dow Chemical Company), and 576 parts by weight of ion exchange water were mixed with each other, and the mixture is stirred and emulsified using a dissolver at 1,500 rpm for 30 minutes. As a result, a monomer emulsion is prepared. Next, 1.20 parts by weight of DOWFAX2A1 (47% solution, manufactured by The Dow Chemical Company) and 1270 parts by weight of ion exchange water are put into a reaction container. After heated to 75° C. under nitrogen gas stream, 75 parts by weight of the monomer emulsion is added. Next, a polymerization initiator solution in which 15 parts by weight of ammonium persulfate is dissolved in 98 parts by weight of ion exchange water is added dropwise to the monomer emulsion for 10 minutes. After causing the reaction to occur for 50 minutes after the dropwise addition, the residual monomer emulsion is further added dropwise for 220 minutes. Next, the reaction is further caused to occur for 180 minutes. After cooling, a styrene-acrylic resin particle dispersion in which the solid content concentration is adjusted to 30% by weight is obtained as a resin particle dispersion (1). The average particle diameter of the resin particles is 300 nm.

The polyimide precursor "water" solution (PAA-1) and the resin particle dispersion (1) are mixed with each other such that a ratio of the polyimide precursor solid to the resin particle solid is 25:75 (100:300). As a result, a resin particle-dispersed polyimide precursor "water" solution is obtained. The resin particle-dispersed polyimide precursor "water" solution is applied to a glass substrate and is dried at room temperature (25° C.) for 5 hours. This film is heated at 120° C. for 1 hour, is peeled off from the glass substrate, and is dipped in toluene (Tol) for 30 minutes to elute the resin particles thereinto. After dried, the film is heated from room temperature to 270° C. at a speed of 10° C./min, is held at 270° C. for 1 hour, and is cooled to room temperature. As a result, a porous polyimide film (PIF-7) having a thickness of 25 µm is obtained. A porous film is obtained using this porous polyimide film (PIF-7) having a single-layer structure.

Gas components produced from the obtained porous film are measured by GC-MS.

Example 8

A porous polyimide film (PIF-8) having a thickness of 25 µm is obtained using the same method as in Example 7, except that: the polyimide precursor "water" solution (PAA-1) and the resin particle dispersion (1) are mixed with each other to obtain a resin particle-dispersed polyimide precursor "water" solution in which a ratio of the polyimide precursor solid to the resin particle solid is 50:50 (100:100); and the dipping time in Tol is changed to 2 hours. A porous film is obtained using this porous polyimide film (PIF-8) having a single-layer structure.

Gas components produced from the obtained porous film are measured by GC-MS.

Example 9

A porous polyimide film (PIF-9) having a thickness of 25 μm is obtained using the same method as in Example 7, except that: the polyimide precursor "water" solution (PAA-1) and the resin particle dispersion (1) are mixed with each other to obtain a resin particle-dispersed polyimide precursor "water" solution in which a ratio of the polyimide precursor solid to the resin particle solid is 75:25 (100:33); and the dipping time in Tol is changed to 12 hours. A porous film is obtained using this porous polyimide film (PIF-9) having a single-layer structure.

Gas components produced from the obtained porous film are measured by GC-MS.

Comparative Example 3

30 parts by weight of monodisperse spherical silica particles having an average diameter of 550 nm (manufactured by Nippon Shokubai Co., Ltd.; sphericity: 1.0, particle diameter distribution index: 1.20) is dispersed in 30 parts by weight of N-methylpyrrolidone (NMP). 20 parts by weight of the silica particle dispersion and 100 parts by weight of the polyimide precursor "N-methylpyrrolidone" solution (RPAA-1) are mixed with each other and stirred such that a weight ratio of the polyimide precursor solid to the spherical silica particle solid is 25:75, and then the mixture is applied to a glass substrate. The film is heated at 120° C. for 1 hour, is peeled off from the glass substrate, is heated from room temperature to 380° C. at a speed of 10° C./min, is held at 380° C. for 1 hour, and is cooled to room temperature. As a result, a silica-polyimide composite film is obtained. This silica-polyimide composite film is dipped in a 10% by weight hydrogen fluoride solution to dissolve and remove silica for 6 hours, is sufficiently washed with water, and is dried. As a result, a porous polyimide film (RPIF-3) is obtained. A porous film is obtained using this porous polyimide film (RPIF-3) having a single-layer structure.

Gas components produced from the obtained porous film are measured by GC-MS.

In a case where crosslinked resin particles are used, it is thought that the crosslinked resin particles are not dissolved in a solvent and swell. Therefore, in the film, cracking occurs remarkably, the removal of the crosslinked polymethyl methacrylate copolymer does not progress, and non-dissolved resin particles remain.

Gas components produced from the obtained porous film are measured by GC-MS.

Example 10

Preparation of Resin Particle Dispersion 900 parts by weight of styrene, 100 parts by weight of butyl methacrylate, 15.7 part by weight of dodecanethiol, 15.8 parts by weight of a surfactant DOWFAX2A1 (47% solution, manufactured by The Dow Chemical Company), and 576 parts by weight of ion exchange water were mixed with each other, and the mixture is stirred and emulsified using a dissolver at 1500 rpm for 30 minutes. As a result, a monomer emulsion is prepared. Next, 1.20 parts by weight of DOWFAX2A1 (47% solution, manufactured by The Dow Chemical Company) and 1270 parts by weight of ion exchange water are put into a reaction container. After heated to 75° C. under nitrogen gas stream, 75 parts by weight of the monomer emulsion is added, Next, a polymerization initiator solution in which 15 parts by weight of ammonium persulfate is dissolved in 98 parts by weight of ion exchange water is added dropwise to the monomer emulsion for 10 minutes. After causing the reaction to occur for 50 minutes after the dropwise addition, the residual monomer emulsion is further added dropwise for 220 minutes. Next, the reaction is further caused to occur for 180 minutes. After cooling, a styrene-acrylic resin particle dispersion in which the solid content concentration is adjusted to 30% by weight is obtained as a resin particle dispersion (1). The average particle diameter of the resin particles is 300 nm.

100 parts by weight of the resin particle dispersion (1) is put into a flask equipped with a stirring rod, a thermometer, and a dropping funnel. 4.09 g (37.84 mmol) of p-phenylenediamine (molecular weight: 108.14) and 7.50 g (74.15 mmol) of N-methylmorpholine (organic amine compound) are added to the flask, and the components are stirred and dispersed at 20° C. for 10 minutes. Further, 10.91 g (37.07 mmol) of 3,3',4,4'-biphenyl tetracarboxylic dianhydride (molecular weight: 294.22) is added to this solution, and then while maintaining the reaction temperature at 20° C., the solution is stirred for 24 hours to dissolve the components and to perform a reaction. As a result, a resin particle-dispersed polyimide precursor "water" solution is obtained (a ratio of the polyimide precursor solid to the resin particle solid is 67:33 (100:49)).

The solution is applied to a glass substrate and is dried at room temperature (25° C.) for 5 hours. This film is heated at 120° C. for 1 hour, is peeled off from the glass substrate, and is dipped in toluene (Tol) for 30 minutes to elute the resin particles thereinto. After dried, the film is heated from room temperature to 270° C. at a speed of 10° C./min, is held at 270° C. for 1 hour, and is cooled to room temperature. As a result, a porous polyimide film (PIF-10) having a thickness of 25 μm is obtained. A porous film is obtained using this porous polyimide film (PIF-10) having a single-layer structure.

Gas components produced from the obtained porous film are measured by GC-MS.

Example 11

The polyimide precursor "water/isopropanol" solution (PAA-2) is diluted to 10 times, a crosslinked polymethyl methacrylate copolymer (SSX-101, manufactured by Sekisui Plastics Co., Ltd.) having an average particle diameter of 1 μm is added thereto such that a weight ratio of the polyimide precursor solid to the resin particle solid is 25:75 (100:300), and the solution is stirred on a web rotor to prepare a dispersion solution. This dispersion solution is applied to a glass substrate to form a coating film having a thickness of 30 μm after drying on the glass substrate, and this coating film is dried at room temperature for 1 hour and then is dried at 90° C. for 1 hour. Further, the film is heated from 90° C. to 400° C. at a speed of 10° C./min, is held at 400° C. for 1 hour, and is cooled to room temperature. As a result, a porous polyimide film (PIF-11) is obtained. A porous film is obtained using this porous polyimide film (PIF-11) having a single-layer structure.

Since the film is not dipped in a solvent, cracking caused by the swelling of the resin is not observed. However, a high temperature is required to remove the resin.

Gas components produced from the obtained porous film are measured by GC-MS.

Example 12

10 parts of a non-crosslinked polymethyl methacrylate-styrene copolymer (FS-102E, manufactured by Nipponpaint Co., Ltd.) having an average particle diameter of 0.1 µm and 1 part of a polyvinyl butyral resin (S-LEC SV-02, manufactured by Sekisui Chemical Co., Ltd.) are added to 30 parts of ethanol, and the solution is stirred on a web rotor to prepare a dispersion solution. This dispersion solution is applied to a glass substrate to form a coating film having a thickness of 30 µm after drying on the glass substrate, and this coating film is dried at 90° C. for 1 hour to form a resin particle layer.

The polyimide precursor "water" solution (PAA-1) is diluted to 10 times, is applied to the resin particle layer, and then is defoamed under reduced pressure. As a result, the polyimide precursor "water" solution (PAA-1) is impregnated into pores between the resin particles. The film is dried overnight at room temperature (25° C.; hereinafter, the same shall be applied) and is wiped with water such that a surface of the resin particle layer is exposed. As a result, a residual polyimide precursor is removed from the resin particle layer. This film is heated at 120° C. for 1 hour, is peeled off from the glass substrate, and is dipped in tetrahydrofuran (THF) for 30 minutes to elute the resin particles thereinto. After dried, the film is dipped in acetic anhydride at 70° C. for 1 hour and is washed with THF. After washed, the film is heated from room temperature to 230° C. at a speed of 10° C./min, is held at 230° C. for 1 hour, and is cooled to room temperature. As a result, a porous polyimide film (PIF-12) is obtained. A porous film is obtained using this porous polyimide film (PIF-12) having a single-layer structure.

Gas components produced from the obtained porous film are measured by pyrolysis gas chromatography-mass spectrometry (hereinafter, referred to as "GC-MS").

Comparative Example 4

A porous polyimide film (RPIF-4) is obtained using the same method as in Example 11, except that the heating temperature is changed to 500° C. A porous film is obtained using this porous polyimide film (RPIF-4) having a single-layer structure. In the obtained film, the flexibility deteriorates as compared to the film of Example 11. Therefore, the film is likely to crack when bent.

Gas components produced from the obtained porous film are measured by pyrolysis gas chromatography-mass spectrometry (hereinafter, referred to as "GC-MS").

Example 13

The resin particle-dispersed polyimide precursor "water" solution obtained in Example 10 is applied to a glass substrate and then is dried at room temperature (25° C.) for 1 hour. Cellulose nanofiber non-woven fabric (manufactured by Asahi Kasei Corporation) is laminated on the obtained coating film, is pressed using a rubber roll, and is heated at 120° C. for 1 hour. This film is peeled off from the glass substrate, and is dipped in tetrahydrofuran (THF) for 30 minutes to elute the resin particles thereinto. After dried, the film is heated from room temperature to 270° C. at a speed of 10° C./min, is held at 270° C. for 1 hour, and is cooled to room temperature. As a result, a porous film, which includes the porous polyimide film (PIF-13) and has a laminate structure having a thickness of 70 µm, is obtained.

The porous polyimide film layer is separated from the obtained porous film, and gas components produced from the porous polyimide film are measured by pyrolysis gas chromatography-mass spectrometry (hereinafter, referred to as "GC-MS").

Example 14

The polyimide precursor "water/isopropanol" solution (PAA-3) is diluted to 10 times, a crosslinked polymethyl methacrylate copolymer (SSX-101, manufactured by Sekisui Plastics Co., Ltd.) having an average particle diameter of 1 µm is added thereto such that a weight ratio of the polyimide precursor solid to the resin particle solid is 25:75 (100:300), and the solution is stirred on a web rotor to prepare a dispersion solution. This dispersion solution is applied to a glass substrate to form a coating film having a thickness of 30 µm after drying on the glass substrate, and this coating film is dried at room temperature for 1 hour and then is dried at 90° C. for 1 hour. Further, the film is heated from 90° C. to 420° C. at a speed of 10° C./min, is held at 420° C. for 1 hour, and is cooled to room temperature. As a result, a porous polyimide film (PIF-14) is obtained. A porous film is obtained using this porous polyimide film (PIF-14) having a single-layer structure.

Since the film is not dipped in a solvent, cracking caused by the swelling of the crosslinked resin is not observed. However, a high temperature is required to remove the resin.

Gas components produced from the obtained porous film are measured by GC-MS.

Evaluation of Pore Diameter Distribution

Regarding the porous polyimide film obtained in Examples 1 to 14 and Comparative Examples 1 to 4, the pore diameter distribution is evaluated (the maximum pore diameter, the minimum pore diameter, the average pore diameter, and the ratio of a long diameter to a short diameter are evaluated). Specifically, the evaluation is performed using the above-described method.

Evaluation of Cracking

Regarding the porous polyimide films obtained in Examples 1 to 14 and Comparative Examples 1 to 4, cracking is evaluated. A specific method is as follows. A 1 cm² area of the polyimide film is observed with a microscope at a magnification of 500 times, a portion having a size of 0.1 mm or higher is counted as a crack, and whether or not cracking occurs is determined by visual inspection.

Evaluation Criteria

A: No cracking
B: Cracking occurs at one portion to three positions
C: Cracking occurs at four or more portions Analysis of Organic Amine Compound, Resin Other Than Polyimide Resin, and Polar Aprotic Solvent Using the above-described method, the content of each component is measured by GC-MS.

TABLE 2

| | | PI | | | PI Precursor | | Organic | | Ratio PI | | |
|---|---|---|---|---|---|---|---|---|---|---|---|
| | Porous PI Film | Precursor Solution | Solvent | Tetracarboxylic Acid | Diamine Compound | Amine Compound | Resin Particles | Precursor/ Particle | Removal Treatment | Exposure Treatment |
| Example 1 | PIF-1 | PAA-1 | Water | BPDA | PDA | MMO | PMMA/St | — | THF | Performed |
| Example 2 | PIF-2 | PAA-1 | Water | BPDA | PDA | MMO | PMMA/St | — | THF | Performed |

TABLE 2-continued

| | Porous PI Film | PI Precursor Solution | Solvent | PI Precursor Tetracarboxylic Acid | Diamine Compound | Organic Amine Compound | Resin Particles | Ratio PI Precursor/Particle | Removal Treatment | Exposure Treatment |
|---|---|---|---|---|---|---|---|---|---|---|
| Example 3 | PIF-3 | PAA-2 | Water/IPA | BPDA | ODA | MMO | PMMA/St | 25/75 | THF | Not Performed |
| Example 4 | PIF-4 | PAA-3 | Water/IPA | PMDA | ODA | DMAEt | PMMA/St | — | THF | Performed |
| Example 5 | PIF-5 | PAA-4 | Water/IPA | PMDA | ODA | DMIz | PMMA/St | 25/75 | Tol | Not Performed |
| Example 6 | PIF-6 | PAA-5 | Water/NMP | PMDA | ODA | DMAEt | PMMA/St | 25/75 | Tol | Not Performed |
| Example 7 | PIF-7 | PAA-1 | Water | BPDA | PDA | MMO | PBMA/St | 25/75 | Tol | Not Performed |
| Example 8 | PIF-8 | PAA-1 | Water | BPDA | PDA | MMO | PBMA/St | 50/50 | Tol | Not Performed |
| Example 9 | PIF-9 | PAA-1 | Water | BPDA | PDA | MMO | PBMA/St | 75/25 | Tol | Not Performed |
| Example 10 | PIF-10 | — | Water | BPDA | PDA | MMO | PBMA/St | 67/33 | Tol | Not Performed |
| Example 11 | PIF-11 | PAA-2 | Water/IPA | BPDA | ODA | MMO | Crosslinked PMMA | 25/75 | Not Performed | Not Performed |
| Example 12 | PIF-12 | PAA-1 | Water | BPDA | PDA | MMO | PMMA/St | — | THF | Performed |
| Example 13 | PIF-13 | — | Water | BPDA | PDA | MMO | PBMA/St | 67/33 | THF | Not Performed |
| Example 14 | PIF-14 | PAA-3 | Water/IPA | PMDA | ODA | DMAEt | Crosslinked PMMA | 25/75 | Not Performed | Not Performed |
| Comparative Example 1 | RPIF-1 | RPAA-1 | NMP | PMDA | ODA | — | PMAA/St | — | THF | Not Performed |
| Comparative Example 2 | RPIF-2 | RPAA-2 | NMP | PMDA | ODA | DMIz | PMMA/St | 25/75 | Tol | Not Performed |
| Comparative Example 3 | RPIF-3 | RPAA-1 | NMP | PMDA | ODA | — | Silica | 25/75 | Hydrofluoric Acid | Not Performed |
| Comparative Example 4 | RPIF-4 | PAA-2 | Water/IPA | BPDA | ODA | MMO | Crosslinked PMMA | 25/75 | Not Performed | Not Performed |

TABLE 3

| | Porous PI Film | Pore Minimum Diameter (μm) | Pore Maximum Diameter (μm) | Pore Average Diameter (μm) | Proportion of Pores in which Long Diameter/Short Diameter is 1 to 2 (%) | Evaluation of Cracking | Content of Organic Amine Compound (% by weight) | Monomer Derived from Resin Soluble in Solvent in which PI Resin is Insoluble | Content of Polar Aprotic Solvent (% by weight) |
|---|---|---|---|---|---|---|---|---|---|
| Example 1 | PIF-1 | 0.09 | 0.12 | 0.11 | 98 | A | 0.038 | 0.31 | Not Detected |
| Example 2 | PIF-2 | 0.09 | 0.12 | 0.11 | 97 | A | 0.020 | 0.19 | Not Detected |
| Example 3 | PIF-3 | 0.08 | 0.13 | 0.12 | 93 | A | 0.040 | 0.25 | Not Detected |
| Example 4 | PIF-4 | 0.09 | 0.12 | 0.11 | 96 | A | 0.052 | 0.11 | Not Detected |
| Example 5 | PIF-5 | 0.11 | 0.18 | 0.15 | 82 | A | 0.012 | 0.27 | Not Detected |
| Example 6 | PIF-6 | 0.1 | 0.18 | 0.15 | 81 | A | 0.251 | 0.45 | 0.001% or lower |
| Example 7 | PIF-7 | 0.33 | 0.41 | 0.37 | 90 | A | 0.019 | 0.21 | Not Detected |
| Example 8 | PIF-8 | 0.33 | 0.4 | 0.37 | 91 | A | 0.023 | 0.20 | Not Detected |
| Example 9 | PIF-9 | 0.32 | 0.39 | 0.36 | 92 | A | 0.024 | 0.18 | Not Detected |
| Example 10 | PIF-10 | 0.31 | 0.40 | 0.36 | 90 | A | 0.022 | 0.21 | Not Detected |
| Example 11 | PIF-11 | 0.89 | 1.19 | 1.03 | 85 | A | 0.011 | 0.86 | Not Detected |
| Example 12 | PIF-12 | 0.09 | 0.12 | 0.11 | 98 | A | 0.82 | 0.79 | Not Detected |
| Example 13 | PIF-13 | 0.32 | 0.40 | 0.37 | 91 | A | 0.023 | 0.22 | Not Detected |
| Example 14 | PIF-14 | 0.88 | 1.15 | 1.01 | 92 | A | 0.003 | 0.54 | Not Detected |
| Comparative Example 1 | RPIF-1 | 0.05 | 1.01 | Amorphous | 30 or Lower | B | Not Detected | 0.29 | 0.051 |
| Comparative Example 2 | RPIF-2 | 0.05 | 1.3 | Amorphous | 30 or Lower | C | 0.015 | 0.11 | 0.013 |
| Comparative Example 3 | RPIF-3 | 0.55 | 0.57 | 0.56 | 98 | C | Not Detected | Not Detected | 0.007 |
| Comparative Example 4 | RPIF-4 | 0.81 | 1.23 | 1.10 | 85 | B | 0.0005 | 0.003 | Not Detected |

Hereinafter, the details of abbreviations in Tables 1 to 3 will be shown.
"PI": polyimide
"PDA": p-phenylenediamine
"ODA": 4,4'-diaminodiphenylether
"BPDA": 3,3',4,4'-biphenyl tetracarboxylic dianhydride
"PMDA": pyromellitic dianhydride
"MMO": N-methylmorpholine
"DMIz": 1,2-dimethylimidazole
"DMAEt": 2-dimethylaminoethanol
"THF": tetrahydrofuran
"Tol": toluene "PMMA/St": non-crosslinked polymethyl methacrylate-styrene copolymer
"PBMA/St": non-crosslinked polybutyl methacrylate-styrene copolymer
"Crosslinked PMMA": crosslinked polymethyl methacrylate copolymer
"IPA": isopropanol
"NMP": N-methylpyrrolidone The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A porous film comprising:
   at least one porous polyimide film that includes a polyimide resin, an organic amine compound, and a resin other than a polyimide resin, and that does not include a polar aprotic solvent,
   wherein a content of the organic amine compound is 0.001% by weight or higher with respect to a total weight of the porous polyimide film and
   the shape of pores is substantially spherical.

2. The porous film according to claim 1,
   wherein the resin other than a polyimide resin is a resin having a non-crosslinked structure.

3. The porous film according to claim 1,
   wherein the content of the organic amine compound is from 0.005% by weight to 1.0% by weight with respect to the total weight of the porous polyimide film.

4. The porous film according to claim 2,
   wherein the content of the organic amine compound is from 0.005% by weight to 1.0% by weight with respect to the total weight of the porous polyimide film.

5. The porous film according to claim 1,
   wherein the organic amine compound is a tertiary amine compound.

6. The porous film according to claim 2,
   wherein the organic amine compound is a tertiary amine compound.

7. The porous film according to claim 3,
   wherein the organic amine compound is a tertiary amine compound.

8. The porous film according to claim 1,
   wherein the organic amine compound is at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

9. The porous film according to claim 2,
   wherein the organic amine compound is at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

10. The porous film according to claim 3,
    wherein the organic amine compound is at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

11. The porous film according to claim 5,
    wherein the organic amine compound is at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

12. The porous film according to claim 1,
    wherein a content of the resin other than a polyimide resin is from 0.005% by weight to 1.0% by weight with respect to the total weight of the porous polyimide film.

13. The porous film according to claim 2,
    wherein a content of the resin other than a polyimide resin is from 0.005% by weight to 1.0% by weight with respect to the total weight of the porous polyimide film.

14. The porous film according to claim 3,
    wherein a content of the resin other than a polyimide resin is from 0.005% by weight to 1.0% by weight with respect to the total weight of the porous polyimide film.

15. The porous film according to claim 5,
    wherein a content of the resin other than a polyimide resin is from 0.005% by weight to 1.0% by weight with respect to the total weight of the porous polyimide film.

16. The porous film according to claim 8,
    wherein a content of the resin other than a polyimide resin is from 0.005% by weight to 1.0% by weight with respect to the total weight of the porous polyimide film.

* * * * *